US010743176B1

(12) United States Patent
Khan et al.

(10) Patent No.: US 10,743,176 B1
(45) Date of Patent: Aug. 11, 2020

(54) SECURE ONBOARDING OF A DEVICE HAVING AN EMBEDDED UNIVERSAL INTEGRATED CIRCUIT CARD WITHOUT A PRELOADED PROVISIONING PROFILE

(71) Applicant: Verizon Patent and Licensing Inc., Arlington, VA (US)

(72) Inventors: Taussif Khan, Martinsville, NJ (US); Warren Hojilla Uy, Randolph, NJ (US); Axel Hallo De Wolf, Whippany, NJ (US); Zhengfang Chen, Millburn, NJ (US); Kala Narayanan, Piscataway, NJ (US); Mary Williams, Miltona, MN (US); Musa Kazim Guven, Basking Ridge, NJ (US); Manuel Enrique Caceres, Basking Ridge, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/376,226

(22) Filed: Apr. 5, 2019

(51) Int. Cl.
*H04W 12/02* (2009.01)
*H04W 12/00* (2009.01)
*H04W 12/04* (2009.01)
*H04L 9/32* (2006.01)

(52) U.S. Cl.
CPC ....... *H04W 12/0023* (2019.01); *H04L 9/3263* (2013.01); *H04W 12/00409* (2019.01); *H04W 12/0401* (2019.01)

(58) Field of Classification Search
CPC . H04W 8/183; H04W 8/205; H04W 12/0023; H04W 12/06; H04W 4/50; H04W 4/60; H04W 12/04; H04W 4/70; H04W 8/18; H04W 12/08; H04W 12/10; H04W 8/20; H04W 4/24; H04W 60/00; H04W 12/00401; H04W 12/02; H04W 48/08; H04W 12/00; H04W 12/00514
See application file for complete search history.

(56) References Cited

U.S. PATENT DOCUMENTS

2019/0174299 A1* 6/2019 Ullah ...................... H04W 8/24
2019/0182659 A1* 6/2019 Ahmed ................ H04L 63/102
2019/0191298 A1* 6/2019 Kim ...................... H04W 8/205

OTHER PUBLICATIONS

Gsmu. "eSIM Whitepaper: The what and how of Remote SIM Provisioning". Mar. 2018. 21 pages. https://www.gsma.com/esim/wp-content/uploads/2018/12/esim-whitepaper.pdf.

* cited by examiner

*Primary Examiner* — Liton Miah

(57) ABSTRACT

A user equipment (UE) may receive, from a certificate authority, a first onboarding identifier associated with a private key stored on the UE. The UE may transmit, to a wireless network, an attach request based on the first onboarding identifier. The UE may receive, from the wireless network, a signaling message that includes a second onboarding identifier, wherein the signaling message may be encrypted with a public key paired with the private key stored on the UE. The UE may decrypt the signaling message using the private key stored on the UE to obtain the second onboarding identifier. The UE may obtain a permanent identifier from a Remote SIM Provisioning platform based on the UE completing an authentication procedure using an authentication response obtained from the decrypted signaling message. The UE may then connect to the wireless network using the permanent identifier.

20 Claims, 11 Drawing Sheets

ID
SECURE ONBOARDING OF A DEVICE HAVING AN EMBEDDED UNIVERSAL INTEGRATED CIRCUIT CARD WITHOUT A PRELOADED PROVISIONING PROFILE

BACKGROUND

A universal integrated circuit card (UICC), often referred to as a subscriber identification module (SIM) or SIM card, is a smart card that is often included in an electronic device and used to access Global System for Mobile communications (GSM) networks, Universal Mobile Telecommunications System (UMTS) networks, Long-Term Evolution (LTE) networks, Fifth Generation (5G) networks, and/or the like. For example, the UICC may securely store information used to identify and authenticate a subscriber on a wireless network associated with a particular mobile network operator (MNO). An embedded UICC (eUICC) or embedded SIM (eSIM) is a UICC that can be remotely provisioned with one or more operator profiles. Accordingly, in an electronic device with an eUICC, different operator profiles can be installed, enabled, disabled, deleted, and/or the like without having to physically swap the eUICC.

DETAILED DESCRIPTION OF PREFERRED EMBODIMENTS

Figure 1A:
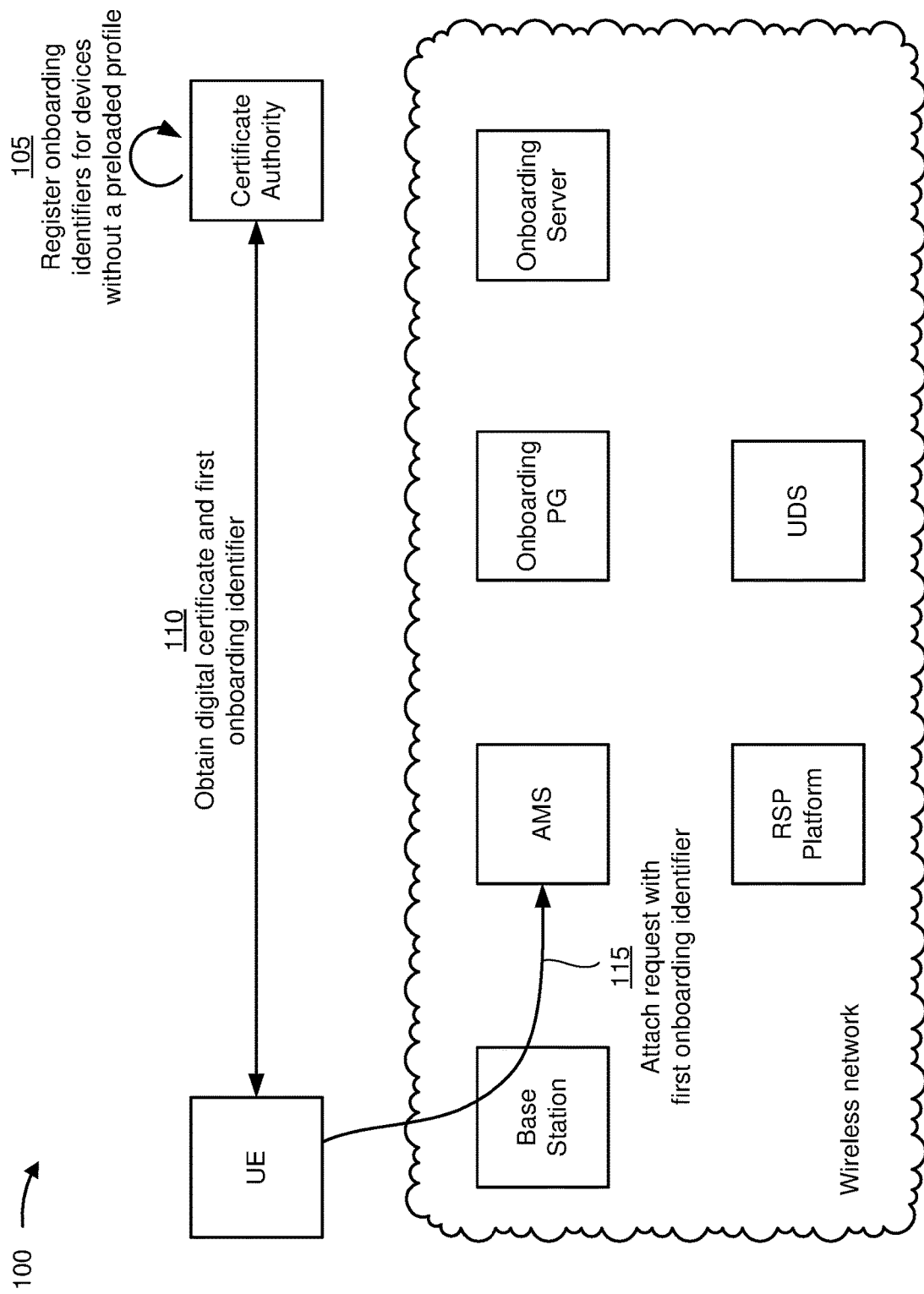
FIGS. 1A-1E are diagrams of one or more example implementations described herein.

The following detailed description of example implementations refers to the accompanying drawings. The same reference numbers in different drawings can identify the same or similar elements.

A traditional subscriber identification module (SIM) (commonly referred to as a SIM card) is used to securely store information for identifying and authenticating a subscriber on a wireless network associated with a particular mobile network operator (MNO). Accordingly, the traditional SIM card is owned and issued by a specific MNO. For example, in a typical scenario, an end user may establish a service contract with an MNO and receive a SIM card that can be inserted into an electronic device, and the SIM card may contain subscription credentials issued and authenticated by the MNO such that the electronic device can connect to the wireless network associated with the MNO using the subscription credentials stored on the SIM card.

Similar to the traditional SIM, a computing module called an embedded SIM (eSIM) has been developed to control authentication and service access for next generation electronic devices, including machine-to-machine (M2M) devices that may operate without end user interaction (e.g., smart meters, light bulbs, appliances, and/or the like) and consumer devices managed by end users (e.g., smart phones, smart watches, wearables, connected cars, and/or the like). However, unlike a traditional SIM, an eSIM is remotely programmable and has a capability to accommodate multiple SIM profiles, each of which may include MNO and subscriber data that would otherwise be stored on a traditional SIM card. For example, the eSIM may be implemented as an embedded Universal Integrated Circuit Card (eUICC) that stores MNO credentials and provides the ability to remotely program (or reprogram) the MNO credentials over-the-air (OTA) through a process called remote SIM provisioning (RSP).

For example, the RSP process may utilize a server-driven push model and/or a client-driven pull model in which an electronic device with an eUICC or eSIM is connected to an RSP platform associated with a particular MNO. The RSP platform may remotely provision the electronic device with a SIM profile that includes data related to a subscription with the particular MNO (e.g., an International Mobile Subscriber Identity (IMSI), an Integrated Circuit Card Identifier (ICCID), security algorithms, and/or the like). To subsequently change to a new MNO, the electronic device may connect to the RSP platform associated with the new MNO and download a new SIM profile that includes data related to a subscription with the new MNO.

Accordingly, eUICC technology has become increasingly popular and is being increasingly deployed by device manufacturers due to the flexibility whereby a device having an eUICC can connect to the RSP platform for any MNO in order to download a suitable SIM profile to onboard live data service for the device. Furthermore, in addition to providing the flexibility to choose any MNO without having to swap out a SIM card, eUICC technology addresses challenges that may arise with respect to changing SIM cards in M2M or Internet of Things (IoT) devices that may be remotely located, hermetically sealed, and/or the like. However, in order to download a SIM profile from the RSP platform associated with an MNO, the device may need initial data connectivity in order to reach the RSP platform. For example, M2M devices or consumer devices may have a special-purpose provisioning profile preloaded on the eUICC, and the provisioning profile may be issued with live network service by a particular MNO to enable access to the RSP platform via a cellular network. Furthermore, consumer devices may additionally, or alternatively, use a non-cellular (e.g., Wi-Fi) network or a shared cellular connection associated with a different device to obtain the initial data connectivity.

In scenarios where a provisioning profile is preloaded on the eUICC, this may create friction at the point of manufacture, as an original equipment manufacturer (OEM) has to preload a SIM profile associated with a particular MNO onto the eUICC. This may introduce additional manufacturing costs and waste computing resources (e.g., memory resources, processor resources, and/or the like) used to preload a temporary provisioning profile that will be overwritten, reprogrammed, and/or the like with an operational SIM profile after the device is activated. Furthermore, using the preloaded provisioning profile may impose costs on the MNO that has to provide live service for the provisioning profile, including communication resources (e.g., bandwidth, radio bearers, and/or the like) used to provide the live service. Further still, use cases that allow a non-cellular (e.g., Wi-Fi) network or a shared cellular connection to be used creates a dependency on such networks or shared connections, which may not always be available. Even when such a network or shared connection is available, these approaches burden the devices that provide the non-cellular network and/or share the cellular connection, which can waste computing resources, degrade device performance, and/or the like.

Some implementations described herein may securely onboard, onto a wireless network, a device having an eUICC without a preloaded provisioning profile. For example, a certificate authority may issue a digital certificate and a first onboarding identifier (e.g., a temporary IMSI, Subscription Permanent Identifier (SUPI), and/or the like registered for the specific purpose of device onboarding) to the device. The first onboarding identifier may be associated with a private key that is stored (e.g., preloaded and/or generated at manufacture time) on the device. Accordingly, the device may use the first onboarding identifier in an initial request to attach to a wireless network, which may query the certificate authority for a public key that is associated with the first onboarding identifier and paired with the private key stored on the device. The wireless network may deliver, to the device, a signaling message that is encrypted with the public key associated with the first onboarding identifier, and the device may use the private key stored on the device to decrypt the signaling message. For example, the signaling message may be decrypted to obtain a second onboarding identifier issued by an MNO associated with the wireless network. The device may use the second onboarding identifier in a second attach request transmitted to the wireless network, which may grant the device access to an RSP platform (e.g., based on the device successfully completing an authentication procedure using information obtained from the decrypted signaling message). Accordingly, the device may download an operational profile containing a permanent identifier for accessing the wireless network from the RSP platform.

In this way, a device having an eUICC can be securely onboarded (e.g., obtain live access) to a wireless network associated with an MNO without having a preloaded provisioning profile, which may conserve various computing resources, network resources, and/or the like that would otherwise be wasted configuring and/or providing live service for a provisioning profile that will be overwritten, reprogrammed, and/or the like with an operational SIM profile after the device is activated. Furthermore, in this way, the device may be securely onboarded to the wireless network without any dependency on a non-cellular (e.g., Wi-Fi) network or another device sharing a cellular connection, which may conserve various computing resources, network resources, and/or the like that would otherwise be consumed servicing traffic to enable access to the RSP platform. Further still, by using a trusted certificate authority to issue the first onboarding identifier and distribute digital certificates, public keys, and/or the like to be used during the onboarding procedure, implementations described herein can be used to securely onboard any device with an eUICC, including M2M and consumer devices, onto a wireless network associated with any MNO.

FIGS. 1A-1E are diagrams of one or more example implementations 100 described herein. As will be described in further detail herein, example implementation(s) 100 can include a user equipment (UE) that has an eUICC, a certificate authority that issues a digital certificate, an onboarding identifier, and/or the like to the user equipment, and one or more onboarding devices—for example, an onboarding Packet Gateway (PG) (e.g., a Long-Term Evolution (LTE) Packet Data Network Gateway (PGW), a 5G User Data Function (UDF), and/or the like), an onboarding server, and/or the like—that may assist with onboarding the user equipment onto a wireless network associated with a particular MNO. Furthermore, as shown in FIGS. 1A-1E, example implementation(s) 100 may include a base station and an access and mobility subsystem (AMS) that may transfer traffic related to onboarding the user equipment, a user data system (UDS) that may participate in authenticating the user equipment (e.g., an LTE Home Subscriber Server (HSS), a 5G Unified Data Management function (UDM), and/or the like), and a remote SIM provisioning (RSP) platform that may remotely provision the user equipment with an operational SIM profile that contains a permanent identifier (e.g., a permanent IMSI, SUPI, Subscription Concealed Identifier (SUCI), Network Access Identifier (NAI), and/or the like) for accessing the wireless network associated with the MNO.

Figure 1B:
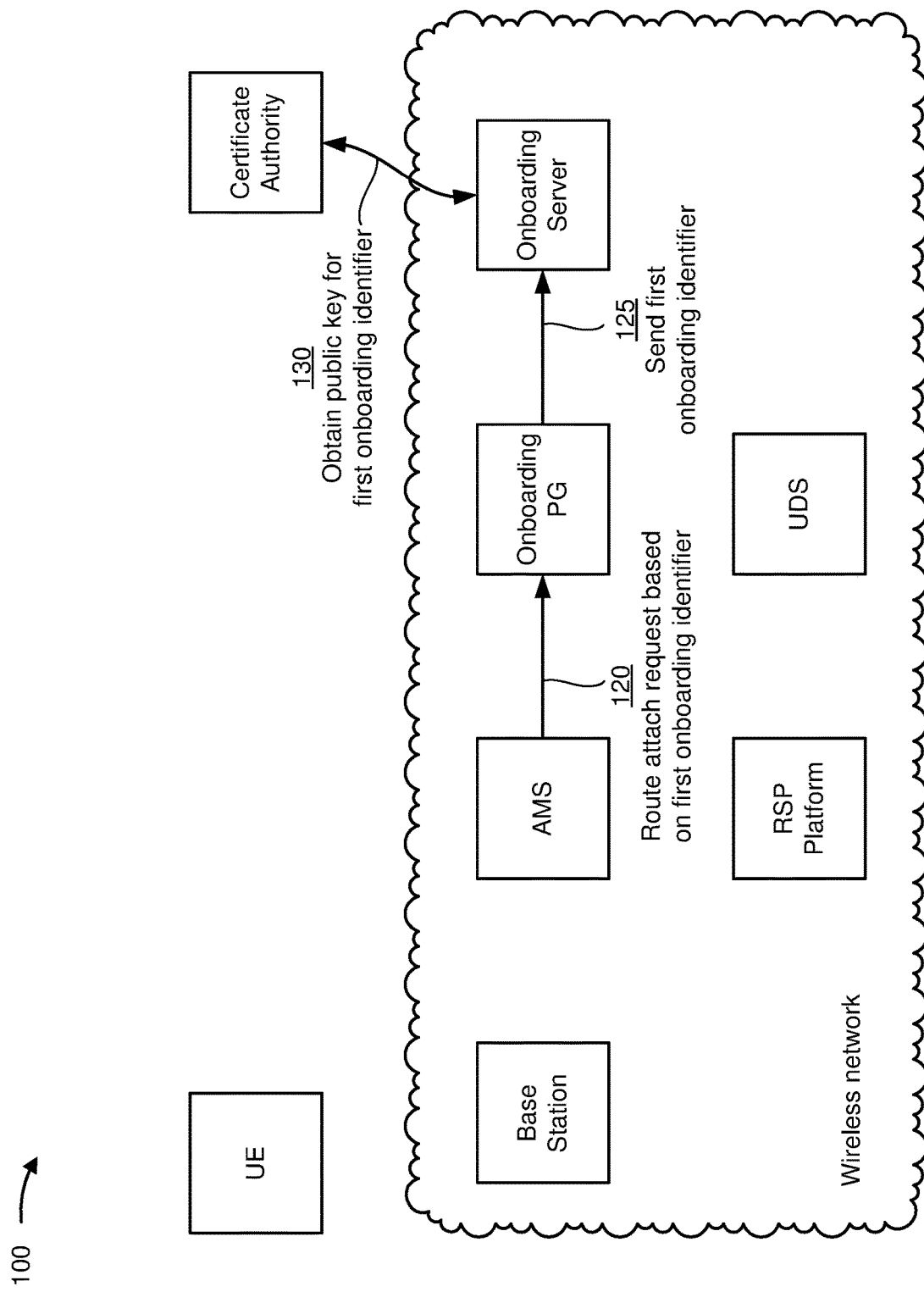
Figure 1C:
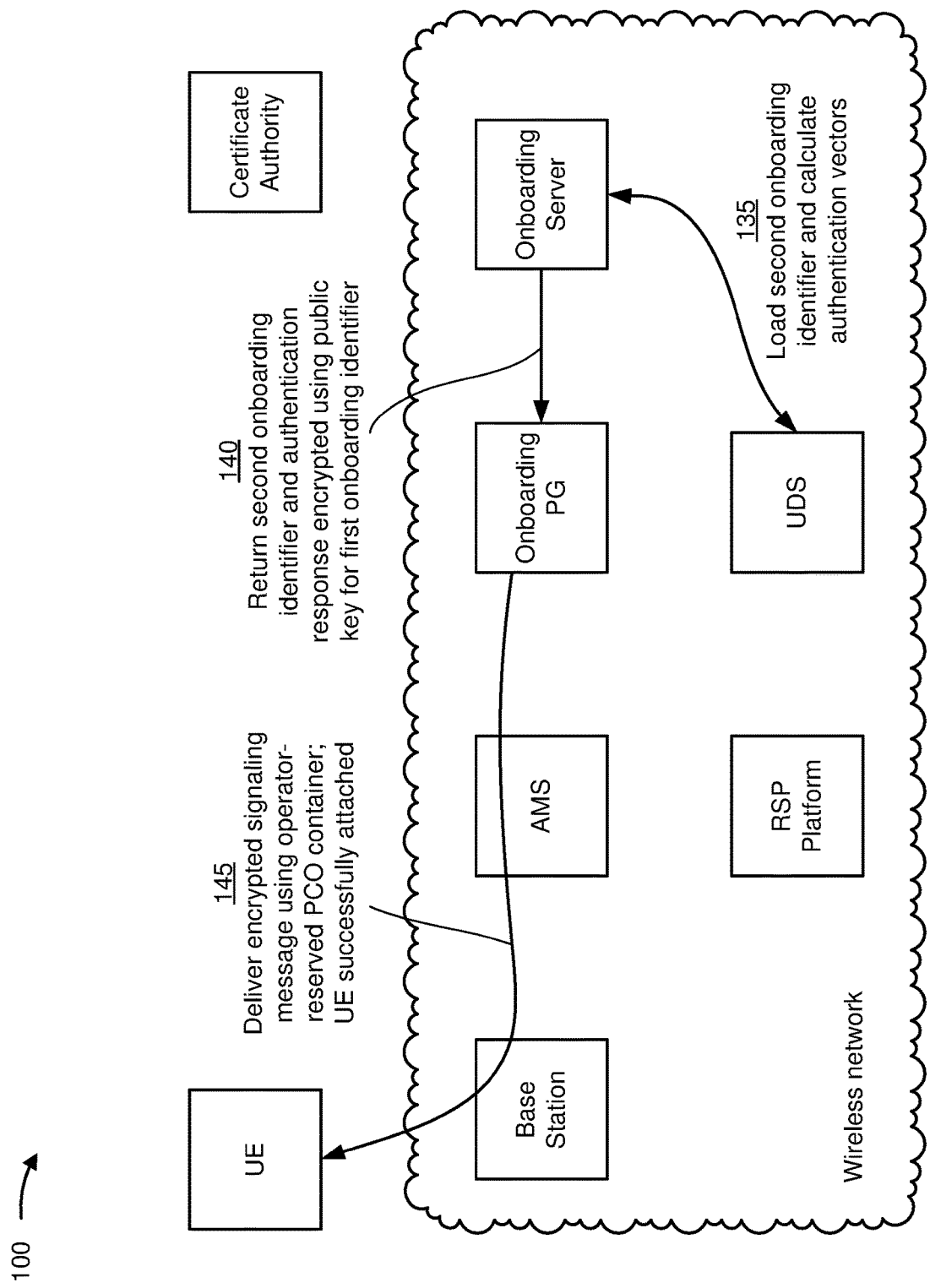
Figure 1D:
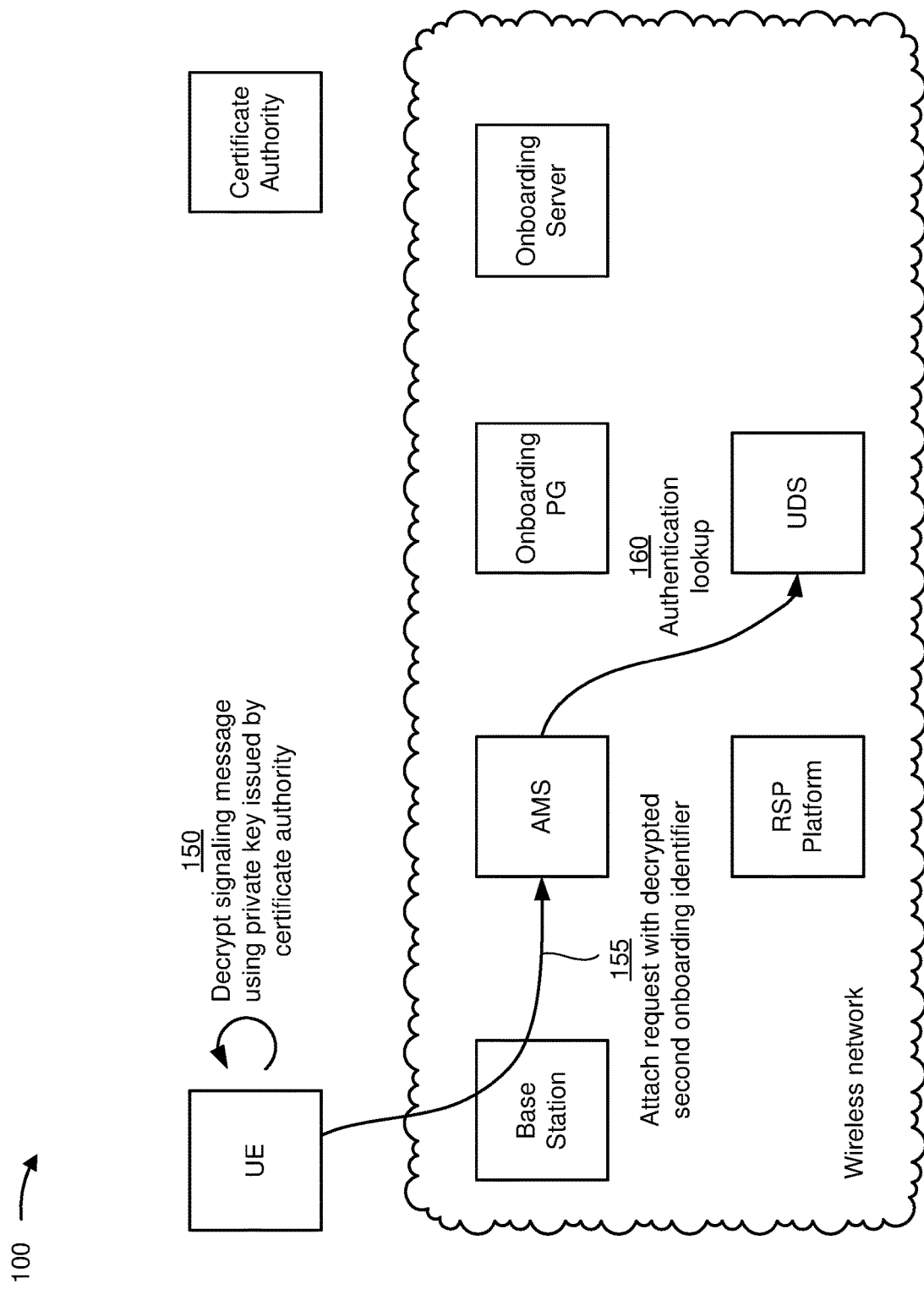
Figure 1E:
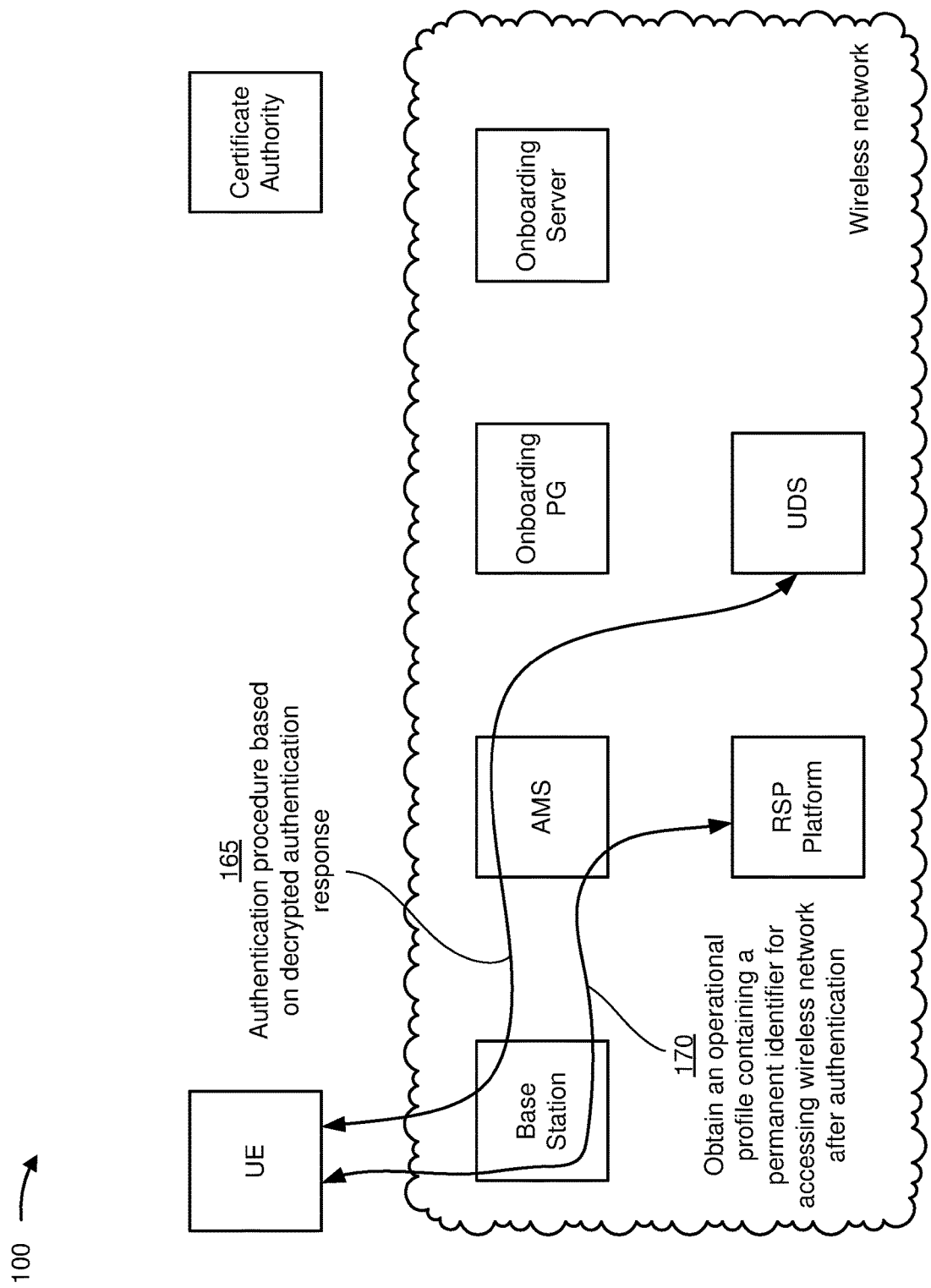

As shown in FIG. 1A, the certificate authority may issue, to the user equipment, a digital certificate including a first onboarding identifier that the user equipment may use in an initial attach request transmitted to a wireless network associated with a mobile network operator. As shown in FIG. 1B, based on the first onboarding identifier, the initial attach request may be routed to one or more onboarding devices, which may query the certificate authority for a public key associated with the first onboarding identifier. As shown in FIG. 1C, the one or more onboarding devices may load a second onboarding identifier and calculate one or more authentication vectors (e.g., an authentication request, an authentication response, and/or the like) to be used in an authentication procedure for the user equipment, and an encrypted signaling message including the second onboarding identifier and the authentication response may be transmitted to the user equipment. As shown in FIG. 1D, the user equipment may decrypt the signaling message using a private key stored on the user equipment to obtain the second onboarding identifier, which may be used in a second attach request transmitted to the wireless network. As shown in FIG. 1E, the user equipment may obtain access to the RSP platform based on successfully completing the authentication procedure (e.g., using the authentication response obtained from the decrypted signaling message) and download an operational profile that contains a permanent identifier for accessing the wireless network from the RSP platform.

As shown in FIG. 1A, and by reference number 105, the certificate authority may register a set of onboarding identifiers for onboarding devices (e.g., the user equipment) that have an eUICC without a preloaded provisioning profile onto a wireless network. In some implementations, the set of onboarding identifiers may include a range of International Mobile Subscriber Identity (IMSIs), Subscription Permanent Identifiers (SUPIs), and/or the like to uniquely identify cellular network users. For example, an IMSI is generally presented as a sequence of digits, including a first set of digits that represent a mobile country code (MCC), which is followed by a second set of digits that represent a mobile network code (MNC) and a third set of digits that represent a mobile subscription identification number (MSIN) for a particular cellular network user. Furthermore, a SUPI is globally unique identifier that may be allocated to a particular subscriber in a 5G wireless network, where example SUPI formats include the IMSI and Network Access Identifier (NAI). Accordingly, in some implementations, the set of onboarding identifiers reserved by the certificate authority may have an MCC, an MNC, an MSIN, an NAI, and/or the like within a particular range and/or having a particular format that is associated with onboarding devices onto a wireless network. In some implementations, information related to the set of onboarding identifiers reserved by the certificate authority may be shared with one or more MNOs such that one or more nodes on a wireless network associated with an MNO may recognize identifiers that are within the range and/or have the format that is associated with onboarding devices onto a wireless network, as described elsewhere herein.

In some implementations, the certificate authority may further generate, issue, or otherwise obtain digital certificates, public keys, and/or the like to be paired or otherwise associated with the set of onboarding identifiers. For example, the digital certificate associated with a particular onboarding identifier may include various fields such as a serial number assigned to the digital certificate, a signature algorithm identifying a cryptographic algorithm that the certificate authority used to sign the digital certificate, an identifier for the certificate authority, a validity period for the digital certificate (e.g., a date and/or time when the digital certificate becomes valid, a date and/or time when the digital certificate expires, and/or the like), information about a subject or owner to which the digital certificate was issued, the public key issued to the digital certificate subject, and/or the like.

In some implementations, the certificate authority may further support revocation with respect to the digital certificates. For example, the certificate authority may revoke a digital certificate that was improperly issued, discovered to be counterfeit, associated with a private key that has been compromised (e.g., lost or stolen), issued by a compromised subordinate certificate authority, owned by a subject that failed to adhere to one or more policies, and/or the like. As such, when the certificate authority revokes one or more digital certificates, information related to the revoked digital certificate(s) can be made available through a certificate revocation list (CRL), an Online Certificate Status Protocol (OCSP), and/or the like.

As further shown in FIG. 1A, and by reference number 110, the user equipment may obtain a digital certificate and a first onboarding identifier from the certificate authority. For example, a device manufacturer may certify the user equipment with the certificate authority, and upon successful certification, the first onboarding identifier may be selected from among the set of onboarding identifiers that the certificate authority registered for the purpose of onboarding eUICC devices (e.g., M2M devices and/or consumer devices) that may be manufactured without a preloaded provisioning profile. The first onboarding identifier, the digital certificate associated with the first onboarding identifier, and a private key that the certificate authority issued for the first onboarding identifier may be loaded or otherwise stored on the user equipment (e.g., at manufacture time). In this way, the certificate authority may act as a trusted third party between device manufacturers and MNOs, enabling devices that do not have a preloaded provisioning profile (e.g., do not have a mobile network identifier) to be quickly and easily onboarded onto a wireless network associated with any MNO.

Additionally, or alternatively, the certificate authority may issue the digital certificate and the first onboarding identifier to the user equipment based on a certificate signing request (CSR) received from the user equipment. For example, the user equipment may generate a key pair that includes a private key and a corresponding public key using a suitable algorithm (e.g., Rivest-Shamir-Adleman (RSA), Elliptic-curve cryptography (ECC), Digital Signature Algorithm (DSA), and/or the like). The user equipment may generate the CSR based on the public key and an International Mobile Equipment Identity (IMEI) that uniquely identifies the user equipment, and the CSR may be provided to the certificate authority for signing. Accordingly, in response to the CSR, the certificate authority may issue a signed certificate that associates the first onboarding identifier issued to the user equipment with the public key that corresponds to the private key generated by the user equipment and the IMEI that uniquely identifies the user equipment. The certificate authority may return the signed certificate to the user equipment for storage, and the user equipment may use the first onboarding identifier included in the signed certificate to onboard onto a wireless network associated with an MNO. In some implementations, the user equipment may obtain the digital certificate through a certificate enrollment process based on the Simple Certificate Enrollment Protocol (SCEP), or the device manufacturer may perform the certificate enrollment process at a secure facility during manufacturing using a secure computing device that implements one or more Representational State Transfer (REST) application program interfaces provided by the certificate authority.

In this way, by issuing the digital certificate to the user equipment based on the CSR, security may be improved because the private key is not exposed outside the user equipment. Furthermore, using the IMEI in the digital certificate issued to the user equipment may further enhance security, as the certificate authority may be configured to block issuance of a digital certificate to a device that provides a duplicate IMEI (e.g., to mitigate potential fraudulent IMEI cloning). Furthermore, by sharing information related to the digital certificate (including the first onboarding identifier and/or the IMEI associated with the user equipment) with one or more devices in a wireless network, such device(s) may implement additional security policies based on the first onboarding identifier and/or IMEI (e.g., the IMEI associated with a lost or stolen device may be added to a blacklist to prevent an unauthorized user from using the lost or stolen device to access a wireless network).

As further shown in FIG. 1A, and by reference number 115, the user equipment may use the first onboarding identifier issued by the certificate authority in an initial attach request transmitted to a wireless network associated with a particular MNO. For example, as mentioned above, the first onboarding identifier may be an IMSI, a SUPI, and/or the like that the certificate authority has registered for the purpose of onboarding eUICC-based devices. In some implementations, the first onboarding identifier may be loaded into a modem associated with the user equipment. Accordingly, when the modem is turned on, the modem may detect the wireless network and attempt to attach to the wireless network using the first onboarding identifier loaded in the modem. In this way, computing resources (e.g., processor resources, communication resources, and/or the like) may be conserved because the user equipment does not need to perform any particular scan procedure to detect a wireless network associated with a specific MNO, as would be the case for a preloaded provisioning profile issued by a specific MNO. In this way, computing resources may be further conserved, onboarding time may be reduced, and/or the like because the user equipment can simply connect to the first wireless network detected by the modem.

In the illustrated example, the modem may detect the base station associated with the wireless network and transmit the initial attach request using the first onboarding identifier issued by the certificate authority. In the initial attach request, the user equipment may further include a request for a second onboarding identifier associated with the MNO providing the wireless network (e.g., a pseudo IMSI, Subscription Concealed Identifier (SUCI), and/or the like). Furthermore, in some implementations, the user equipment may include, in the initial attach request, an identifier associated with a Protocol Configuration Options (PCO) container used to convey a signaling message (e.g., a non-access stratum (NAS) signaling message) that includes an encrypted pseudo IMSI, SUCI, and/or the like associated with the MNO providing the wireless network. For example, the identifier associated with the PCO container may be in a range from FF00H to FFFFH, which is reserved for MNO-specific use, although other suitable identifiers may be used. In general, the identifier associated with the PCO container (e.g., the PCO ID) may be reserved to conveying information related to onboarding eUICC-based devices that may not have a preloaded provisioning profile.

As shown in FIG. 1A, the base station (e.g., an evolved Node B (eNB)) may receive the initial attach request and pass the initial attach request to the access and mobility subsystem (AMS) associated with the wireless network. For example, the AMS may be implemented as a mobility management entity (MME) in a 4G or Long-Term Evolution (LTE) wireless network, as an Access and Mobility Management Function (AMF) and Session Management Function (SMF) in a 5G wireless network, and/or the like.

As shown in FIG. 1B, and by reference number 120, the AMS may route the initial attach request to one or more onboarding devices (e.g., the onboarding PG) based on the first onboarding identifier used in the initial attach request. For example, as mentioned above, the certificate authority may share information related to the set of onboarding identifiers reserved for device onboarding with one or more MNOs, including the MNO associated with the wireless network illustrated in example implementation(s) 100. Accordingly, the AMS may recognize that the first onboarding identifier included in the initial attach request is associated with a public land mobile network (PLMN) range associated with onboarding eUICC-based devices. For example, as further mentioned above, the first onboarding identifier may be an IMSI, a SUPI, and/or another suitable identifier that includes a particular MCC and MNC combination to uniquely identify a particular PLMN in a PLMN range associated with onboarding eUICC-based devices.

Accordingly, based on the AMS recognizing that the first onboarding identifier is associated with a PLMN range associated with onboarding eUICC-based devices (e.g., rather than a subscriber identifier from the UDS), the initial attach request may be routed to the one or more onboarding devices. For example, as shown in FIG. 1B, the initial attach request may be routed to the onboarding PG. As further shown in FIG. 1B, and by reference number 125, the onboarding PG may send the first onboarding identifier to the onboarding server.

As further shown in FIG. 1B, and by reference number 130, the onboarding server may query the certificate authority using the first onboarding identifier to obtain the digital certificate, public key, IMEI, and/or other suitable information associated with the first onboarding identifier and the corresponding private key stored on the user equipment. As described elsewhere herein, the public key obtained from the certificate authority may be used to encrypt information to be sent back to the user equipment in response to the initial attach request.

As shown in FIG. 1C, and by reference number 135, the onboarding server may load a second onboarding identifier (e.g., the pseudo IMSI, SUCI, and/or the like requested by the user equipment) and communicate with the UDS to calculate one or more authentication vectors for the user equipment based on the second onboarding identifier. For example, in some implementations, the onboarding server may maintain a pool of onboarding identifiers used to onboard new devices onto the wireless network (e.g., a pool of pseudo IMSIs), and the second onboarding identifier provided to the onboarding server may be selected from the pool of onboarding identifiers. Additionally, or alternatively, where the first onboarding is a SUPI, the onboarding server may generate a SUCI based on the SUPI, and the generated SUCI may be passed to the UDS and sent down to the user equipment. Furthermore, the one or more authentication vectors may generally include one or more parameters to be used during an authentication procedure. For example, the one or more parameters to be used during the authentication procedure may include a network challenge to be used in an authentication request to be sent to the user equipment, an expected user response to be used in an authentication response received from the user equipment, one or more keys (e.g., a cipher key, an integrity key, and/or the like), an authentication token, and/or the like. In this way, by obtaining the second onboarding identifier and communicating with the UDS to calculate the one or more authentication vectors, the onboarding server may obtain information that the user equipment can use to initiate another more individualized authenticated attach request and connect to the RSP platform to download an operational profile for accessing the wireless network.

As further shown in FIG. 1C, and by reference number 140, the onboarding server may return, to the onboarding PG, the second onboarding identifier (e.g., the pseudo IMSI, SUCI, and/or the like) associated with the MNO providing the wireless network and further return, to the onboarding PG, the expected user response to be used in the authentication response. The second onboarding identifier and the expected user response may be encrypted using the public key obtained from the certificate authority. Accordingly, because the public key obtained from the certificate authority is paired with the first onboarding identifier used in the initial attach request, information encrypted with that public key can be decrypted only by the corresponding private key paired with the first onboarding identifier. In this way, if the user equipment is able to decrypt the second onboarding identifier and the expected user response (or an encrypted signaling message that includes the second onboarding identifier and the expected user response), devices on the wireless network can trust that the user equipment knows the corresponding private key and therefore owns the public key paired with the first onboarding identifier.

As further shown in FIG. 1C, and by reference number 145, an encrypted signaling message including the second onboarding identifier and the expected user response may be delivered to the user equipment using the operator-reserved PCO container indicated in the initial attach request, and the user equipment may be successfully attached to the wireless network with the first onboarding identifier. For example, in some implementations, the onboarding PG may load the second onboarding identifier and the expected authentication response received from the onboarding server into an appropriate signaling message (e.g., the operator-reserved PCO container having an identifier in the range FF00H to FFFFH), and this information may be sent from the onboarding PG to the AMS. In some implementations, the AMS may accept the initial attach request and send the signaling message to the user equipment.

As shown in FIG. 1D, and by reference number 150, the user equipment may decrypt the signaling message using the private key associated with the first onboarding identifier. For example, as mentioned above, the private key associated with the first onboarding identifier may be generated by the user equipment without exposure outside the user equipment, issued by the certificate authority and shared with a manufacturer of the user equipment, and/or the like. Accordingly, the private key may have been stored on the user equipment at manufacture time, and the user equipment may use the private key to decrypt the signaling message that was encrypted using the public key obtained from the certificate authority in order to obtain the second onboarding identifier. Furthermore, in some implementations, the user equipment may decrypt the signaling message to obtain the expected authentication response to be used during an authentication procedure for the user equipment.

As further shown in FIG. 1D, and by reference number 155, the user equipment may detach from the wireless network and transmit a second (reattach) request based on receiving the signaling message that includes the second onboarding identifier, the expected authentication response, and/or the like. For example, as mentioned above, the second onboarding identifier may be a pseudo IMSI, a SUCI, and/or the like that is issued by an MNO associated with the wireless network and available to onboard new devices onto the wireless network. Based on the second reattach request including the second onboarding identifier issued by the MNO associated with the wireless network, the AMS may proceed with a business as usual (BAU) attach and grant the user equipment limited access (e.g., allow limited connectivity) to a specific packet data network (PDN) for the purpose of downloading an operational profile from the RSP platform.

For example, as further shown in FIG. 1D, and by reference number 160, the AMS may transmit, to the UDS, an authentication lookup to the UDS based on the second onboarding identifier, which may trigger an authentication procedure based on the one or more authentication vectors previously calculated by the UDS.

As shown in FIG. 1E, and by reference number 165, the UDS and the user equipment may exchange a sequence of messages associated with an authentication procedure. For example, in some implementations, the authentication procedure may include a first message in which the UDS sends, to the user equipment, an authentication request that includes the network challenge based on the authentication lookup performed by the AMS. As mentioned above, the one or more authentication vectors that were calculated for the second onboarding identifier may include an expected user response to the network challenge, which was encrypted using the public key associated with the first onboarding identifier used in the initial attach request. Accordingly, if the user equipment has the correct private key stored thereon, the user equipment will be able to decrypt the expected user response using the private key. The user equipment may transmit, in response to the authentication request, an authentication response that includes the expected user response obtained from decrypting the signaling message. The UDS may verify that the authentication response includes the correct expected response, in which case the user equipment may be authenticated and granted limited authorization to connect to the RSP platform for the purpose of downloading an operational profile onto the eUICC of the user equipment.

Accordingly, as further shown in FIG. 1E, and by reference number 170, the user equipment may connect to the RSP platform and obtain an operational profile that contains a permanent identifier (e.g., a permanent IMSI, NAI, SUPI, SUCI, and/or the like) that can be used to access and communicate over the wireless network. In some implementations, after the operational profile containing the permanent identifier has been downloaded onto and enabled on the eUICC of the user equipment, the user equipment may reattach to the wireless network with the permanent identifier and delete or otherwise disable the second onboarding identifier received from the wireless network. In some implementations, based on one or more devices in the wireless network (e.g., the AMS) observing the new attach procedure with the permanent identifier, such device(s) may communicate with the onboarding server to indicate that the second onboarding identifier previously issued to the user equipment is available to reuse (e.g., can be returned to the pool of onboarding identifiers and made available for reuse to onboard a new device onto the wireless network).

Furthermore, in some implementations, the user equipment may use the operational profile obtained from the RSP platform to subsequently change to a new MNO. For example, after downloading the operational profile containing the permanent identifier onto the eUICC and using the permanent identifier to reattach to the wireless network associated with the MNO, the user equipment may communicate over the wireless network to access the RSP platform associated with the new MNO and download, onto the eUICC, a new profile that includes data related to a subscription with the new MNO. Accordingly, the user equipment may disable the operational profile associated with the previous MNO, enable the new profile downloaded from the RSP platform associated with the new MNO, and use the new profile to access and communicate over a wireless network provided by the new MNO.

As indicated above, FIGS. 1A-1E are provided as one or more examples. Other examples can differ from what is described with regard to FIGS. 1A-1E. For example, in some implementations, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) in implementation(s) 100 may perform one or more functions described as being performed by another set of devices in implementation(s) 100.

Figure 2:
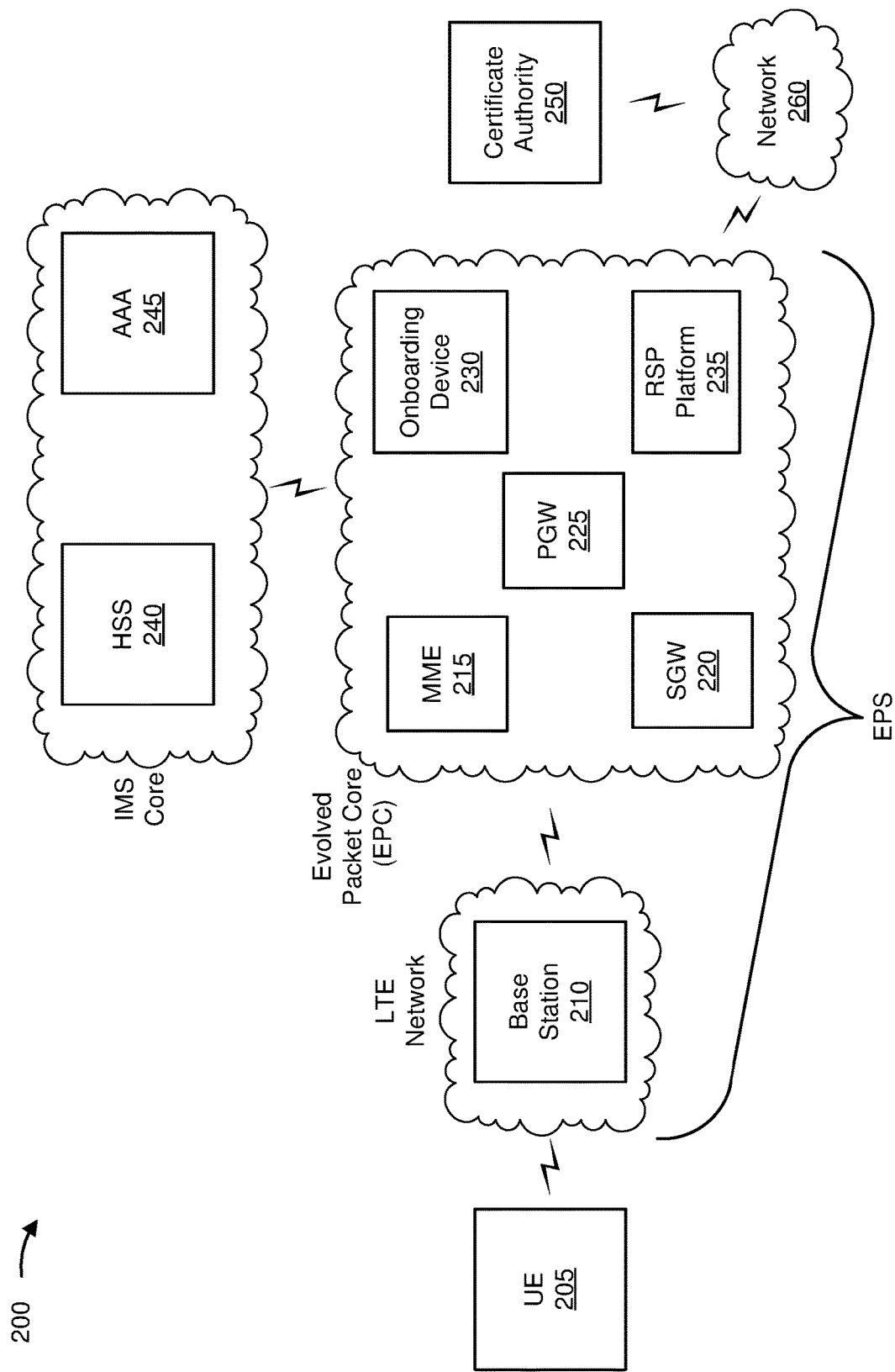
FIGS. 2-3 are diagrams of one or more example environments in which systems and/or methods described herein may be implemented.

FIG. 2 is a diagram of an example environment 200 in which systems and/or methods described herein may be implemented. As shown in FIG. 2, environment 200 may include a user equipment 205, a base station 210, a mobility management entity device (MME) 215, a serving gateway (SGW) 220, a packet data network gateway (PGW) 225, an onboarding device 230, a remote SIM provisioning (RSP) platform 235, a home subscriber server (HSS) 240, an authentication, authorization, and accounting server (AAA) 245, a certificate authority 250, and a network 260. Devices of environment 200 may interconnect via wired connections, wireless connections, or a combination of wired and wireless connections.

Some implementations are described herein as being performed within a Long-Term Evolution (LTE) network for explanatory purposes. Some implementations may be performed within a network that is not an LTE network, such as a third generation (3G) network, a fifth generation (5G) network, and/or the like.

Environment 200 may include an evolved packet system (EPS) that includes an LTE network and/or an evolved packet core (EPC). The LTE network may include a radio access network (RAN) that includes one or more base stations 210 that take the form of evolved Node Bs (eNBs) via which user equipment 205 communicates with the EPC. The EPC may include MME 215, SGW 220, PGW 225, onboarding device 230, and/or RSP platform 235, which enable user equipment 205 to communicate with network 260 and/or an Internet protocol (IP) multimedia subsystem (IMS) core. The IMS core may include HSS 240 and/or AAA 245, and may manage device registration and authentication, session initiation, and/or the like, associated with user equipment 205. HSS 240 and/or AAA 245 may reside in the EPC and/or the IMS core.

User equipment 205 includes one or more devices capable of communicating with base station 210 and/or a network (e.g., network 260). For example, user equipment 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, an Internet of Things (IoT) device (e.g., a smart appliance, a smart light, a connected vehicle, and/or the like), and/or a similar device. User equipment 205 may send traffic to and/or receive traffic from network 260 (e.g., via base station 210, MME 215, SGW 220, and/or PGW 225). In some implementations, user equipment 205 may receive a digital certificate and a first onboarding identifier from certificate authority 250, may use the first onboarding identifier in an initial request to attach to a wireless network (e.g., via base station 210), and may receive (e.g., via base station 210, MME 215, and/or the like) a signaling message that is encrypted with a public key associated with the first onboarding identifier. User equipment 205 may decrypt the signaling message using a private key stored on user equipment 205 to obtain a second onboarding identifier issued by a mobile network operator (MNO) associated with the wireless network, and may use the second onboarding identifier in a reattach request transmitted to the wireless network. In some implementations, user equipment 205 may obtain access to RSP platform 235 based on the second onboarding identifier, and RSP platform 235 may remotely provision user equipment 205 with an operational SIM profile that contains a permanent identifier (e.g., a permanent International Mobile Subscriber Identity (IMSI)) for accessing and communicating over the wireless network associated with the MNO.

Base station 210 includes one or more devices capable of transferring traffic, such as audio, video, text, packets, and/or other traffic, destined for and/or received from user equipment 205. In some implementations, base station 210 may include an eNB associated with the LTE network that receives traffic from and/or sends traffic to network 260 via MME 215, SGW 220, and/or PGW 225. Additionally, or alternatively, one or more base stations 210 may be associated with a RAN that is not associated with the LTE network. Base station 210 may send traffic to and/or receive traffic from user equipment 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with user equipment 205. In some implementations, MME 215 may perform operations relating to authentication of user equipment 205. Additionally, or alternatively, MME 215 may facilitate the selection of a particular SGW 220 and/or a particular PGW 225 to serve traffic to and/or from user equipment 205. MME 215 may perform operations associated with handing off user equipment 205 from a first base station 210 to a second base station 210 when user equipment 205 is transitioning from a first cell associated with the first base station 210 to a second cell associated with the second base station 210. Additionally, or alternatively, MME 215 may select another MME (not pictured), to which user equipment 205 should be handed off (e.g., when user equipment 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 260 (e.g., via PGW 225) and/or other network devices associated with the EPC and/or the IMS core. SGW 220 may also receive traffic from network 260 and/or other network devices, and may send the received traffic to user equipment 205 via base station 210. Additionally, or alternatively, SGW 220 may perform operations associated with handing off user equipment 205 to and/or from an LTE network.

PGW 225 includes one or more devices capable of providing connectivity for user equipment 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 260. Additionally, or alternatively, PGW 225 may receive traffic from network 260, and may send the traffic to user equipment 205 via SGW 220 and base station 210. PGW 225 may record data usage information (e.g., byte usage), and may provide the data usage information to AAA 245.

Onboarding device 230 includes one or more devices, such as one or more server devices, capable of receiving, generating, storing, processing, and/or providing information that relates to securely onboarding user equipment 205 onto a wireless network. For example, onboarding device 230 may include an onboarding PGW, an onboarding server, a device that combines the functions of an onboarding PGW and an onboarding server, and/or the like. In some implementations, an initial attach request from user equipment 205 may be routed to onboarding device 230 (e.g., via MME 215) based on the initial attach request including a first onboarding identifier issued by certificate authority 250. Onboarding device 230 may query certificate authority 250 for a public key associated with the first onboarding identifier and use the public key to encrypt a signaling message that includes a second onboarding identifier issued by the MNO associated with the wireless network. Furthermore, in some implementations, the encrypted signaling message may include information (e.g., an authentication response) to be used during an authentication procedure, which may be generated by communicating with HSS 240 to calculate one or more authentication vectors for user equipment 205.

RSP platform 235 includes one or more devices, such as one or more server devices, capable of receiving, generating, storing, processing, and/or providing information that relates to remotely provisioning user equipment 205 with an operational SIM profile that contains a permanent identifier for accessing and communicating over a wireless network associated with a particular MNO. For example, in some implementations, RSP platform 235 may include a Subscription Manager for Data Preparation (SM-DP) device that prepares, stores, and protects SIM profiles (including MNO credentials), downloads and installs a SIM profile onto an eUICC associated with user equipment 205, and/or the like. Additionally, or alternatively, RSP platform 235 may include a Subscription Manager for Secure Routing (SM-SR) device that secures a communication link between the eUICC and the SM-DP device, enables, disables, deletes, and/or otherwise manages a status of SIM profiles on the eUICC associated with user equipment 205, and/or the like. Additionally, or alternatively, RSP platform 235 may include a Subscription Manager for Data Preparation+(SM-DP+) device that encapsulates the functions of both an SM-DP device and an SM-SR device.

HSS 240 includes one or more devices, such as one or more server devices, capable of managing (e.g., receiving, generating, storing, processing, and/or providing) information associated with user equipment 205. For example, HSS 240 may manage subscription information associated with user equipment 205, such as information that identifies a subscriber profile of a user associated with user equipment 205, information that identifies services and/or applications that are accessible to user equipment 205, location information associated with user equipment 205, a network identifier (e.g., a network address) that identifies user equipment 205, information that identifies a treatment of user equipment 205 (e.g., quality of service information, a quantity of minutes allowed per time period, a quantity of data consumption allowed per time period, and/or the like), and/or similar information. HSS 240 may provide this information to one or more other devices of environment 200 to support the operations performed by those devices. In some implementations, HSS 240 may receive, generate, store, process, and/or provide information related to authenticating user equipment 205. For example, HSS 240 may provide onboarding device 230 with one or more authentication vectors for authenticating user equipment 205 and exchange one or more messages with user equipment 205 during an authentication procedure to authenticate an identity of user equipment 205.

AAA 245 includes one or more devices, such as one or more server devices, that perform authentication, authorization, and/or accounting operations for communication sessions associated with user equipment 205. For example, AAA 245 may perform authentication operations for user equipment 205 and/or a user of user equipment 205 (e.g., using one or more credentials), may control access, by user equipment 205, to a service and/or an application (e.g., based on one or more restrictions, such as time-of-day restrictions, location restrictions, single or multiple access restrictions, read/write restrictions, and/or the like), may track resources consumed by user equipment 205 (e.g., a quantity of voice minutes consumed, a quantity of data consumed, and/or the like), and/or may perform similar operations.

Certificate authority 250 includes one or more devices capable of managing (e.g., receiving, generating, storing, processing, and/or providing) information associated with digital certificates and onboarding identifiers (e.g., temporary IMSIs, SUPIs, and/or the like) used to onboard devices onto a wireless network. In some implementations, certificate authority 250 may register a set of onboarding identifiers for the purpose of onboarding devices onto wireless networks, and information related to the set of onboarding identifiers may be shared with one or more mobile network operators. Certificate authority 250 may issue, to user equipment 205, a digital certificate and an onboarding identifier that user equipment 205 can use in an initial request to attach to a wireless network (e.g., in response to a certificate signing request that includes an IMEI associated with user equipment 205, a public key corresponding to a private key generated by user equipment 205, and/or the like). Certificate authority 250 may also provide, to one or more devices associated with a wireless network, the public key linked to the onboarding identifier issued to user equipment 205, which the one or more devices associated with the wireless network can use to encrypt data used to onboard user equipment 205 onto the wireless network (e.g., a temporary IMSI, SUCI, and/or the like issued by the MNO associated with the wireless network, an authentication response to be used during an authentication procedure, and/or the like).

Network 260 includes one or more wired and/or wireless networks. For example, network 260 may include a telecommunications network (e.g., a 3G network, an LTE network, a 5G network, a code division multiple access (CDMA) network, and/or the like), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these and/or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
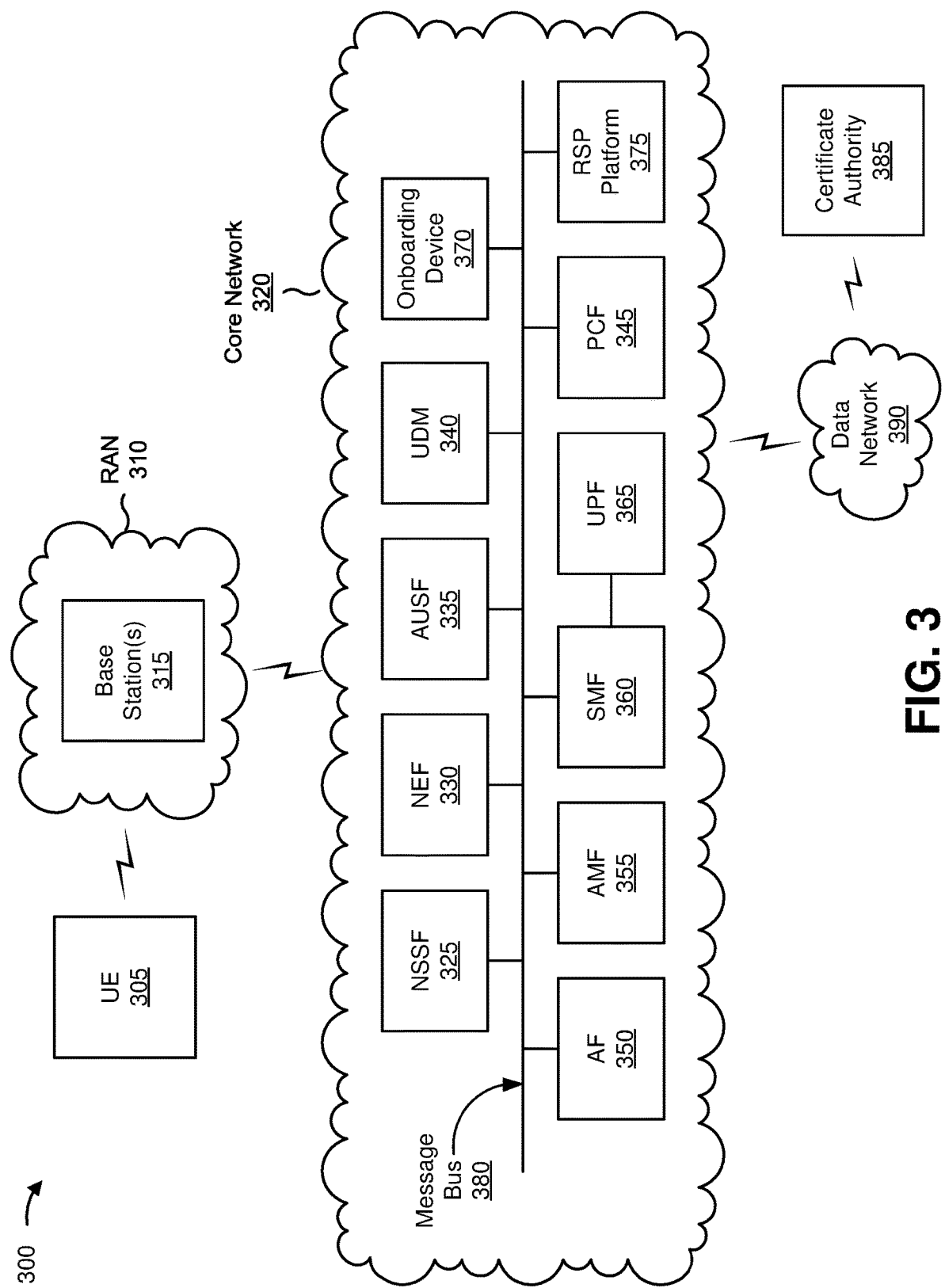

FIG. 3 is a diagram of another example environment 300 in which systems, functional architectures, and/or methods described herein can be implemented. As shown in FIG. 3, environment 300 can include a UE 305, a RAN 310, a base station 315, a core network 320, a certificate authority 385, and a data network 390. As further shown in FIG. 3, core network 320 can include, for example, a Network Slice Selection Function (NSSF) 325, a Network Exposure Function (NEF) 330, an Authentication Server Function (AUSF) 335, a Unified Data Management (UDM) function 340, a Policy Control Function (PCF) 345, an Application Function (AF) 350, an Access and Mobility Management Function (AMF) 355, a Session Management Function (SMF) 360, a User Plane Function (UPF) 365, an onboarding device 370, and an RSP platform 375, which can be communicatively connected via a message bus 380 that can be comprised of one or more physical communication channels and/or one or more virtual communication channels. Devices of environment 300 can interconnect via wired connections, wireless connections, or a combination of wired and wireless connections.

UE 305 includes one or more devices capable of communicating with base station 315 and/or a network (e.g., RAN 310). For example, UE 305 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 305 can be capable of communicating using uplink (e.g., UE to base station) communications, downlink (e.g., base station to UE) communications, and/or sidelink (e.g., UE-to-UE) communications. In some implementations, UE 305 can include a machine-type communication (MTC) UE, such as an evolved or enhanced MTC (eMTC) UE. In some implementations, UE 305 can include an Internet of Things (IoT) UE, such as a narrowband IoT (NB-IoT) UE and/or the like.

RAN 310 includes a base station and is operatively connected, via a wired and/or wireless connection, to the core network 320 through UPF 365. RAN 310 can facilitate communications sessions between UEs (e.g., UE 305) and data network 390 by communicating application-specific data between RAN 310 and core network 320. Data network 390 includes various types of data networks, such as the Internet, a third-party services network, an operator services network, a private network, a wide area network, and/or the like.

Base station 315 includes one or more devices capable of communicating with UE 305 using a cellular radio access technology (RAT). For example, base station 315 can include a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 315 can transfer traffic between UE 305 (e.g., using a cellular RAT), other base stations 315 (e.g., using a wireless interface or a backhaul interface, such as a wired backhaul interface), RAN 310, and/or data network 390. Base station 315 can provide one or more cells that cover geographic areas. Some base stations 315 can be mobile base stations. Some base stations 315 can be capable of communicating using multiple RATs.

In some implementations, base station 315 can perform scheduling and/or resource management for UEs 305 covered by base station 315 (e.g., UEs 305 covered by a cell provided by base station 315). In some implementations, base stations 315 can be controlled or coordinated by a network controller, which can perform load balancing, network-level configuration, and/or the like. The network controller can communicate with base stations 315 via a wireless or wireline backhaul. In some implementations, base station 315 can include a network controller, a self-organizing network (SON) module or component, or a similar module or component. In other words, base station 315 can perform network control, scheduling, and/or network management functions (e.g., for other base stations 315 and/or for uplink, downlink, and/or sidelink communications of UEs 305 covered by the base station 315).

In some implementations, base station 315 can include a central unit and multiple distributed units. The central unit can coordinate access control and communication with regard to the multiple distributed units. The multiple distributed units can provide UEs 305 and/or other base stations 315 with access to core network 320 or data network 390. For example, in some implementations, the central unit can be a logical node that hosts RRC and PDCP protocols of base station 315 and optionally further hosts an SDAP protocol of base station 315. The multiple distributed units can be logical nodes that host RLC, MAC, and PHY layers of base station 315. In some implementations, one distributed unit can include one or more radios that are used to support one or multiple cells that can provide UEs 305 and/or other base stations 315 with access to core network 320 or data network 390. Furthermore, in some implementations, the central unit can be disaggregated or otherwise split into control plane and user plane nodes. For example, the control plane node can be a logical node hosting the RRC and the control plane part of the PDCP protocol for the central unit of base station 315 while the user plane node can be a logical node that hosts the user plane part of the PDCP protocol and optionally further hosts the SDAP protocol for the central unit of base station 315. In some implementations, a split of layers and/or protocols among the central unit and the multiple distributed units can be flexible.

Accordingly, as used herein, a node associated with RAN 310 (which can be referred to as a "RAN node") can include base station 315, a distributed unit of base station 315, a central unit of base station 315, a control plane part of the central unit of base station 315, a user plane part of the central unit of base station 315, and/or any suitable combination thereof.

Core network 320 can include various functional elements included in a 5G wireless telecommunications system, which can be implemented by one or more of devices (e.g., a device described below with respect to FIG. 4). While the example functional architecture of core network 320 shown in FIG. 3 can be an example of a service-based architecture, in some implementations, core network 320 can be implemented as a reference-point architecture.

As mentioned above, core network 320 can include various functional elements. The functional elements can include, for example, NSSF 325, NEF 330, AUSF 335, UDM 340, PCF 345, AF 350, AMF 355, SMF 360, UPF 365, onboarding device 370, and RSP platform 375. These functional elements can be communicatively connected via a message bus 380, which can be comprised of one or more physical communication channels and/or one or more virtual communication channels. Each of the functional elements shown in FIG. 3 is implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, core network 320 can be operatively connected to RAN 310, data network 390, and/or the like, via wired and/or wireless connections with UPF 365.

NSSF 325 can select network slice instances for one or more UEs, such as UE(s) 305, where NSSF 325 can determine a set of network slice policies to be applied at the RAN 310. By providing network slicing, NSSF 325 allows an operator to deploy multiple substantially independent end-to-end networks potentially with the same infrastructure. In some implementations, each network slice can be customized for different services. NEF 330 can support the exposure of capabilities and/or events in the wireless telecommunications system to help other entities in the wireless telecommunications system discover network services and/or utilize network resources efficiently.

AUSF 335 can act as an authentication server and support the process of authenticating UEs in the wireless telecommunications system. UDM 340 can store subscriber data and profiles in the wireless telecommunications system. UDM 340 can be used for fixed access, mobile access, and/or the like, in core network 320. PCF 345 can provide a policy framework that incorporates network slicing, roaming, packet processing, mobility management, and/or the like.

AF 350 can determine whether UEs provide preferences for a set of network slice policies and support application influence on traffic routing, access to NEF 330, policy control, and/or the like. AMF 355 can provide authentication and authorization of UEs. SMF 360 can support the establishment, modification, and release of communications sessions in the wireless telecommunications system. For example, SMF 360 can configure traffic steering policies at UPF 365, enforce UE IP address allocation and policies, and/or the like. AMF 355 and SMF 360 can act as a termination point for Non-Access Stratum (NAS) signaling, mobility management, and/or the like. SMF 360 can act as a termination point for session management related to NAS. RAN 322 can send information (e.g. the information that identifies the UE) to AMF 355 and/or SMF 360 via PCF 345.

UPF 365 can serve as an anchor point for intra/inter Radio Access Technology (RAT) mobility. UPF 365 can apply rules to packets, such as rules pertaining to packet routing, traffic reporting, handling user plane QoS, and/or the like. UPF 365 can determine an attribute of application-specific data that is communicated in a communications session. UPF 365 can receive information (e.g., the information that identifies the communications attribute of the application) from RAN 322 via SMF 360 or an application program interface.

Onboarding device 370 can receive initial attach request from user equipment 305 (e.g., via AMF 355 and/or SMF 360) based on the initial attach request including a first onboarding identifier issued by certificate authority 385. Onboarding device 370 may query certificate authority 385 for a public key associated with the first onboarding identifier and use the public key to encrypt a signaling message that includes a second onboarding identifier issued by an MNO. Accordingly, UE 305 may decrypt the signaling message to obtain the second onboarding identifier, which may be used in an authenticated attach to access RSP platform 375.

RSP platform 375 may remotely provision UE 305 with an operational SIM profile that contains a permanent identifier for accessing and communicating over a wireless network associated with an MNO. For example, RSP platform 375 may include a Subscription Manager for Data Preparation (SM-DP) device, a Subscription Manager for Secure Routing (SM-SR) device, a Subscription Manager for Data Preparation+(SM-DP+) device, and/or the like.

Message bus 380 represents a communication structure for communication among the functional elements. In other words, message bus 380 can permit communication between two or more functional elements. Message bus 380 can be a message bus, HTTP/2 proxy server, and/or the like.

The number and arrangement of functional elements in core network 320 are provided as one or more examples. In practice, core network 320 can have additional functional elements, fewer functional elements, different functional elements, or differently arranged functional elements than those shown in FIG. 3. Furthermore, two or more functional elements in core network 320 can be implemented within a single device, or a single functional element in core network 320 can be implemented as multiple, distributed devices. Additionally, or alternatively, a set of functional elements (e.g., one or more functional elements) of core network 320 can perform one or more functions described as being performed by another set of functional elements of core network 320.

Certificate authority 385 includes one or more devices capable of managing (e.g., receiving, generating, storing, processing, and/or providing) information associated with digital certificates and onboarding identifiers (e.g., temporary IMSIs, SUPIs, and/or the like) used to onboard devices onto a wireless network. For example, as described elsewhere herein, certificate authority 385 may register a set of onboarding identifiers for the purpose of onboarding devices onto wireless networks, issue digital certificates and onboarding identifiers that UEs 305 can use in an initial request to attach to a wireless network, and provide, to one or more devices in core network 320, the public key linked to the onboarding identifier issued to UE 305.

Data network 390 can include various types of data networks, such as the Internet, a third-party services network, an operator services network, a private network, a wide area network, and/or the like. In some implementations, data network 390 can include one or more application servers configured to support one or more applications associated with a session at the UE(s) 305. Furthermore, in some implementations, data network 390 can include one or more application servers that are deployed at an edge of RAN 310, with such application server(s) co-located with one or more nodes that are associated with RAN 310 (e.g., one or more distributed and/or central units associated with base station 315) and/or one or more nodes associated with core network 320 (e.g., UPF 365).

The number and arrangement of devices and networks shown in FIG. 3 are provided as one or more examples. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
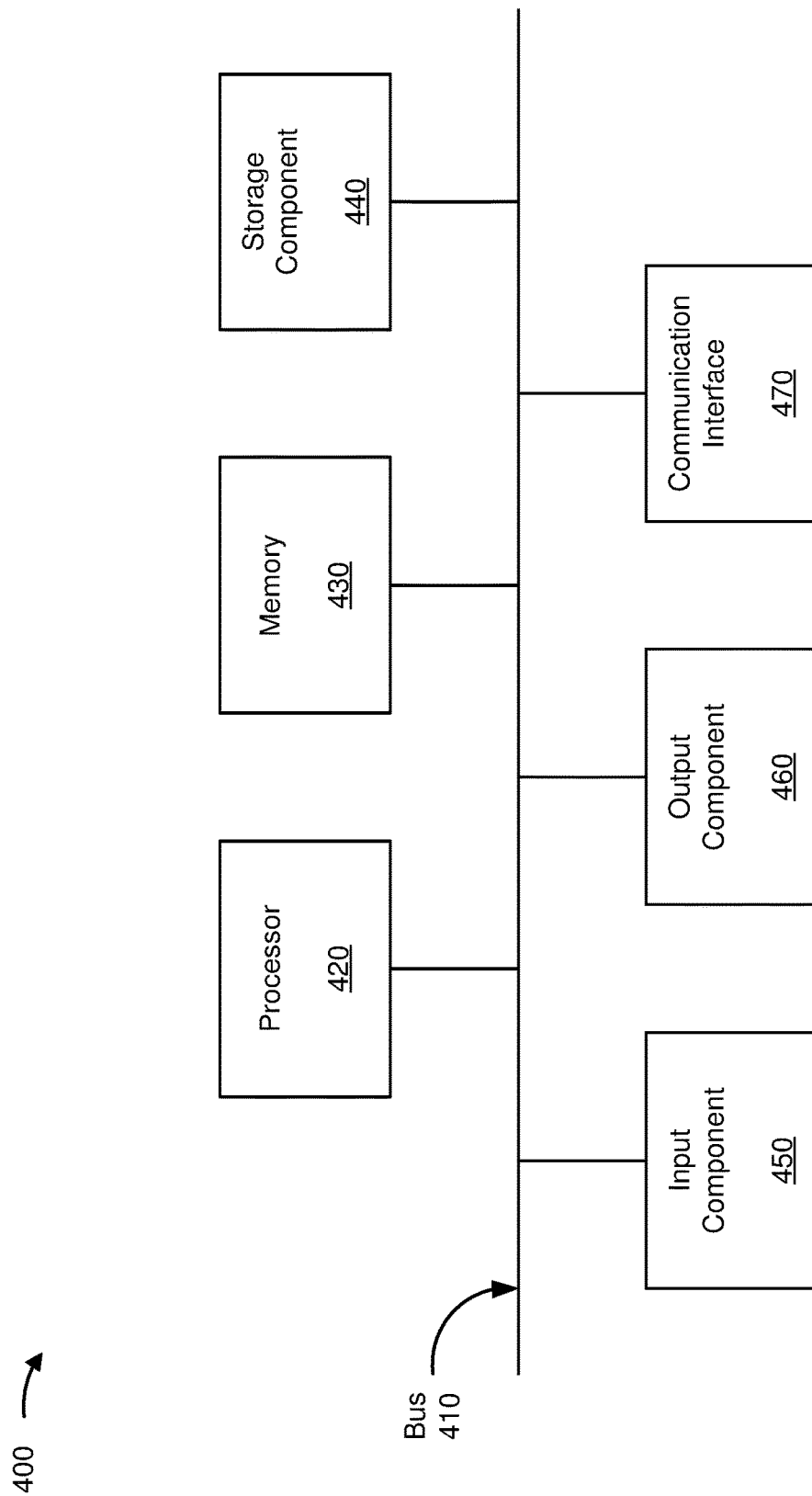
FIG. 4 is a diagram of example components of one or more devices of FIGS. 2-3.

FIG. 4 is a diagram of example components of a device 400. Device 400 may correspond to UE 205, base station 210, MME 215, SGW 220, PGW 225, onboarding device 230, RSP platform 235, HSS 240, AAA 245, certificate authority 250, UE 305, base station 315, NSSF 325, NEF 330, AUSF 335, UDM 340, PCF 345, AF 350, AMF 355, SMF 360, UPF 365, onboarding device 370, RSP platform 375, and/or certificate authority 385. In some implementations UE 205, base station 210, MME 215, SGW 220, PGW 225, onboarding device 230, RSP platform 235, HSS 240, AAA 245, certificate authority 250, UE 305, base station 315, NSSF 325, NEF 330, AUSF 335, UDM 340, PCF 345, AF 350, AMF 355, SMF 360, UPF 365, onboarding device 370, RSP platform 375, and/or certificate authority 385 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
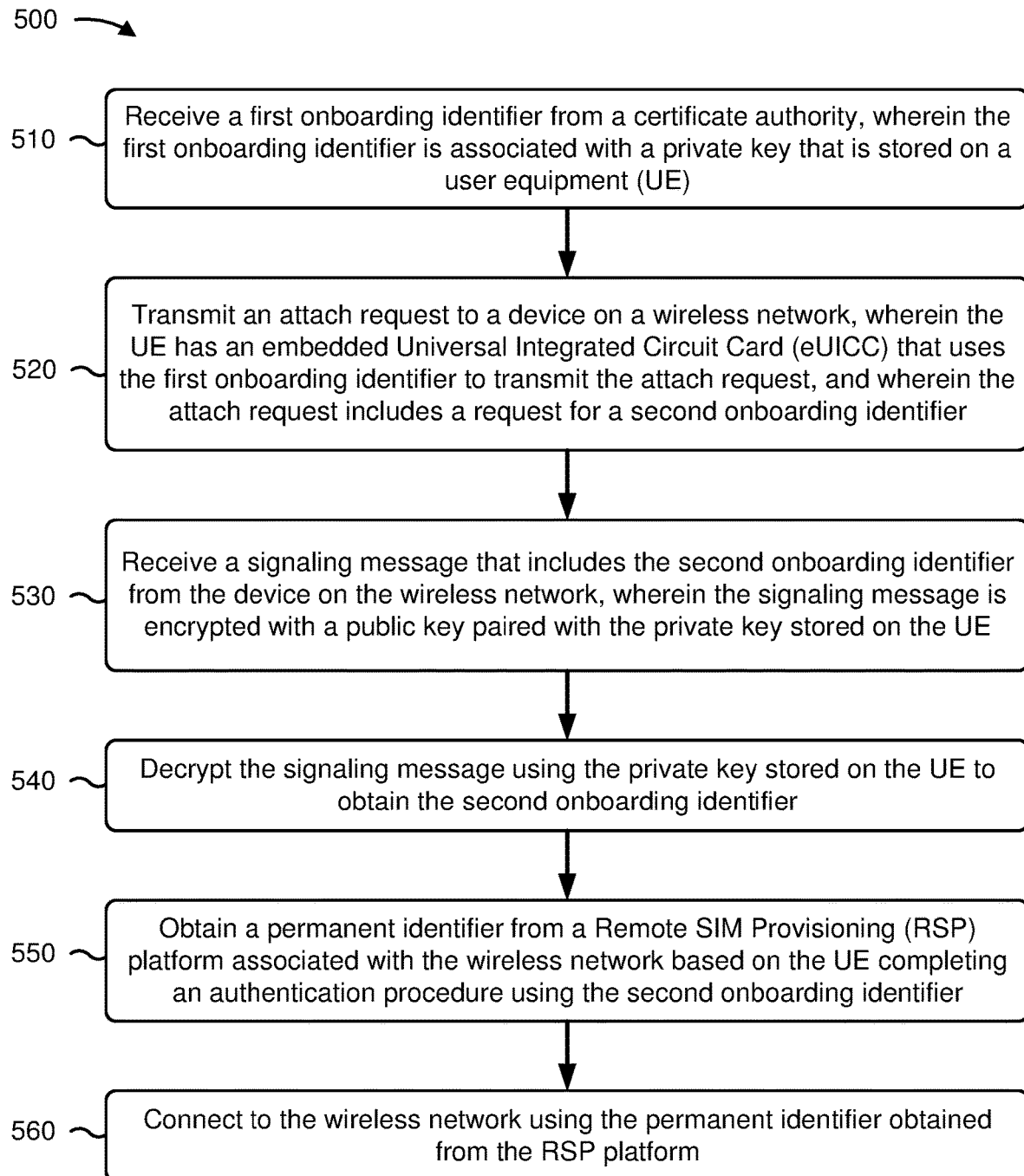
FIGS. 5-7 are flow charts of example processes for secure onboarding of a device having an embedded universal integrated circuit card without a preloaded provisioning profile.

FIG. 5 is a flow chart of an example process 500 for secure onboarding of a device having an embedded universal integrated circuit card without a preloaded provisioning profile. In some implementations, one or more process blocks of FIG. 5 can be performed by a user equipment (e.g., user equipment 205, user equipment 305). In some implementations, one or more process blocks of FIG. 5 can be performed by another device or a group of devices separate from or including the user equipment, such as a base station (e.g., base station 210, base station 315), a core network element (e.g., MME 215, SGW 220, PGW 225, onboarding device 230, RSP platform 235, HSS 240, AAA 245, NSSF 325, NEF 330, AUSF 335, UDM 340, PCF 345, AF 350, AMF 355, SMF 360, UPF 365, onboarding device 370, RSP platform 375, and/or the like), a certificate authority (e.g., certificate authority 250, certificate authority 385), and/or the like.

As shown in FIG. 5, process 500 may include receiving a first onboarding identifier from a certificate authority, wherein the first onboarding identifier is associated with a private key that is stored on a user equipment (block 510). For example, the user equipment (e.g., using processor 420, memory 430, storage component 440, input component 450, output component 460, communication interface 470, and/or the like) may receive a first onboarding identifier from a certificate authority, as described above. In some implementations, the first onboarding identifier is associated with a private key that is stored on the user equipment.

As further shown in FIG. 5, process 500 may include transmitting an attach request to a device on a wireless network, wherein the user equipment has an embedded Universal Integrated Circuit Card (eUICC) that uses the first onboarding identifier to transmit the attach request, and wherein the attach request includes a request for a second onboarding identifier (block 520). For example, the user equipment (e.g., using processor 420, memory 430, storage component 440, input component 450, output component 460, communication interface 470, and/or the like) may transmit an attach request to a device on a wireless network, as described above. In some implementations, the user equipment has an embedded Universal Integrated Circuit Card (eUICC) that uses the first onboarding identifier to transmit the attach request. In some implementations, the attach request includes a request for a second onboarding identifier.

As further shown in FIG. 5, process 500 may include receiving a signaling message that includes the second onboarding identifier from the device on the wireless network, wherein the signaling message is encrypted with a public key paired with the private key stored on the user equipment (block 530). For example, the user equipment (e.g., using processor 420, memory 430, storage component 440, input component 450, output component 460, communication interface 470, and/or the like) may receive a signaling message that includes the second onboarding identifier from the device on the wireless network, as described above. In some implementations, the signaling message is encrypted with a public key paired with the private key stored on the user equipment.

As further shown in FIG. 5, process 500 may include decrypting the signaling message using the private key stored on the user equipment to obtain the second onboarding identifier (block 540). For example, the user equipment (e.g., using processor 420, memory 430, storage component 440, input component 450, output component 460, communication interface 470, and/or the like) may decrypt the signaling message using the private key stored on the user equipment to obtain the second onboarding identifier, as described above.

As further shown in FIG. 5, process 500 may include obtaining a permanent identifier from a Remote SIM Provisioning (RSP) platform associated with the wireless network based on the user equipment completing an authentication procedure using the second onboarding identifier (block 550). For example, the user equipment (e.g., using processor 420, memory 430, storage component 440, input component 450, output component 460, communication interface 470, and/or the like) may obtain a permanent identifier from an RSP platform associated with the wireless network based on the user equipment completing an authentication procedure using the second onboarding identifier, as described above.

As further shown in FIG. 5, process 500 may include connecting to the wireless network using the permanent identifier obtained from the RSP platform (block 560). For example, the user equipment (e.g., using processor 420, memory 430, storage component 440, input component 450, output component 460, communication interface 470, and/or the like) may connect to the wireless network using the permanent identifier obtained from the RSP platform, as described above.

Process 500 can include additional implementations, such as any single implementation or any combination of implementations described below and/or in connection with one or more other processes described elsewhere herein.

In some implementations, the signaling message further includes an authentication response encrypted with the public key paired with the private key stored on the user equipment, and the user equipment decrypts the signaling message using the private key to further obtain the authentication response. In some implementations, when obtaining the permanent identifier, the user equipment may transmit, to the device on the wireless network, a reattach request using the second onboarding identifier obtained from the decrypted signaling message, receive an authentication request associated with the second onboarding identifier, and transmit the authentication response obtained from the decrypted signaling message in response to the authentication request to complete the authentication procedure.

In some implementations, the permanent identifier is associated with an operational profile that the eUICC uses to connect to the wireless network. In some implementations, the user equipment completes the authentication procedure using the second onboarding identifier to obtain access to the RSP platform and download the operational profile from the RSP platform.

In some implementations, the user equipment may generate a key pair that includes the private key and the public key, send, to the certificate authority, a certificate signing request based on the public key and an International Mobile Equipment Identity (IMEI) that uniquely identifies the user equipment, and receive, from the certificate authority, a signed digital certificate that includes the first onboarding identifier based on the certificate signing request.

In some implementations, the request for the second onboarding identifier includes an identifier associated with an operator-reserved Protocol Configuration Options (PCO) container used to convey the signaling message to the user equipment.

In some implementations, the user equipment may enable the permanent identifier for use by the eUICC and disable use of the second onboarding identifier by the eUICC based on enabling the permanent identifier.

In some implementations, the first onboarding identifier and the private key are stored on the user equipment at a time of manufacture.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
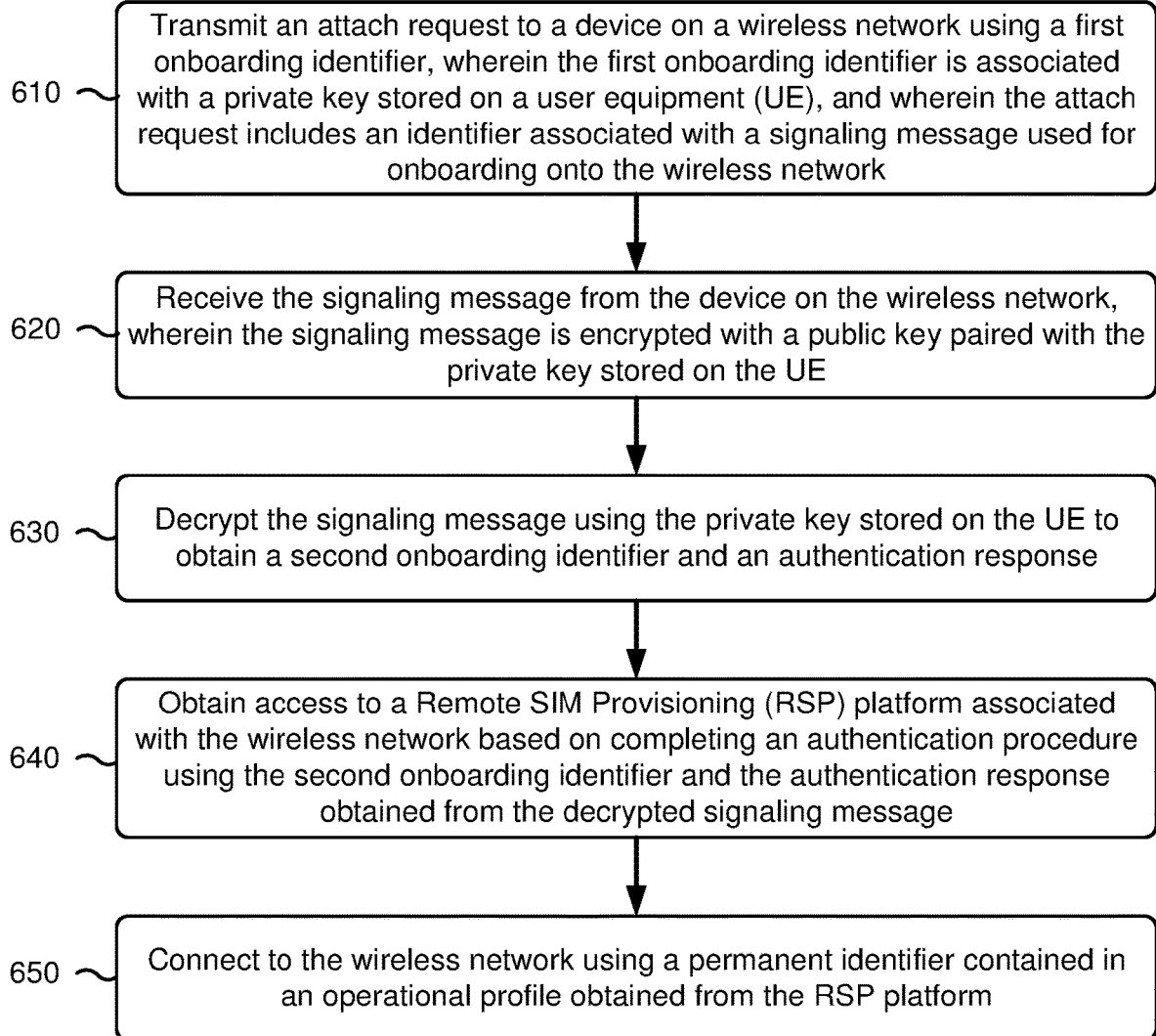

FIG. 6 is a flow chart of an example process 600 for secure onboarding of a device having an embedded universal integrated circuit card without a preloaded provisioning profile. In some implementations, one or more process blocks of FIG. 6 can be performed by a user equipment (e.g., user equipment 205, user equipment 305). In some implementations, one or more process blocks of FIG. 6 can be performed by another device or a group of devices separate from or including the user equipment, such as a base station (e.g., base station 210, base station 315), a core network element (e.g., MME 215, SGW 220, PGW 225, onboarding device 230, RSP platform 235, HSS 240, AAA 245, NSSF 325, NEF 330, AUSF 335, UDM 340, PCF 345, AF 350, AMF 355, SMF 360, UPF 365, onboarding device 370, RSP platform 375, and/or the like), a certificate authority (e.g., certificate authority 250, certificate authority 385), and/or the like.

As shown in FIG. 6, process 600 may include transmitting an attach request to a device on a wireless network using a first onboarding identifier, wherein the first onboarding identifier is associated with a private key stored on a user equipment, and wherein the attach request includes an identifier associated with a signaling message used for onboarding onto the wireless network (block 610). For example, the user equipment (e.g., using processor 420, memory 430, storage component 440, input component 450, output component 460, communication interface 470, and/or the like) may transmit an attach request to a device on a wireless network using a first onboarding identifier stored on the user equipment, as described above. In some implementations, the first onboarding identifier is associated with a private key stored on the user equipment. In some implementations, the attach request includes an identifier associated with a signaling message used for onboarding onto the wireless network.

As further shown in FIG. 6, process 600 may include receiving the signaling message from the device on the wireless network, wherein the signaling message is encrypted with a public key paired with the private key stored on the user equipment (block 620). For example, the user equipment (e.g., using processor 420, memory 430, storage component 440, input component 450, output component 460, communication interface 470, and/or the like) may receive the signaling message from the device on the wireless network, as described above. In some implementations, the signaling message is encrypted with a public key paired with the private key stored on the user equipment.

As further shown in FIG. 6, process 600 may include decrypting the signaling message using the private key stored on the user equipment to obtain a second onboarding identifier and an authentication response (block 630). For example, the user equipment (e.g., using processor 420, memory 430, storage component 440, input component 450, output component 460, communication interface 470, and/or the like) may decrypt the signaling message using the private key stored on the user equipment to obtain a second onboarding identifier and an authentication response, as described above.

As further shown in FIG. 6, process 600 may include obtaining access to a Remote SIM Provisioning (RSP) platform associated with the wireless network based on completing an authentication procedure using the second onboarding identifier and the authentication response obtained from the decrypted signaling message (block 640). For example, the user equipment (e.g., using processor 420, memory 430, storage component 440, input component 450, output component 460, communication interface 470, and/or the like) may obtain access to an RSP platform associated with the wireless network based on completing an authentication procedure using the second onboarding identifier and the authentication response obtained from the decrypted signaling message, as described above.

As further shown in FIG. 6, process 600 may include connecting to the wireless network using a permanent identifier contained in an operational profile obtained from the RSP platform (block 650). For example, the user equipment (e.g., using processor 420, memory 430, storage component 440, input component 450, output component 460, communication interface 470, and/or the like) may connect to the wireless network using a permanent identifier contained in an operational profile obtained from the RSP platform, as described above.

Process 600 can include additional implementations, such as any single implementation or any combination of implementations described below and/or in connection with one or more other processes described elsewhere herein.

In some implementations, the user equipment, when obtaining the access to the RSP platform, may transmit, to the device on the wireless network, a reattach request using the second onboarding identifier obtained from the decrypted signaling message. In some implementations, the user equipment may receive an authentication request associated with the second onboarding identifier, based on the reattach request, and transmit the authentication response obtained from the decrypted signaling message in response to the authentication request to complete the authentication procedure.

In some implementations, the first onboarding identifier is issued by a certificate authority. In some implementations, the second onboarding identifier and the permanent identifier are issued by the mobile network operator associated with the wireless network.

In some implementations, the identifier associated with the signaling message is included in the attach request to register for a container in which the second onboarding identifier and the authentication response are encrypted with the public key paired with the private key stored on the user equipment. In some implementations, the user equipment may disable use of the second onboarding identifier based on using the permanent identifier to connect to the wireless network.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
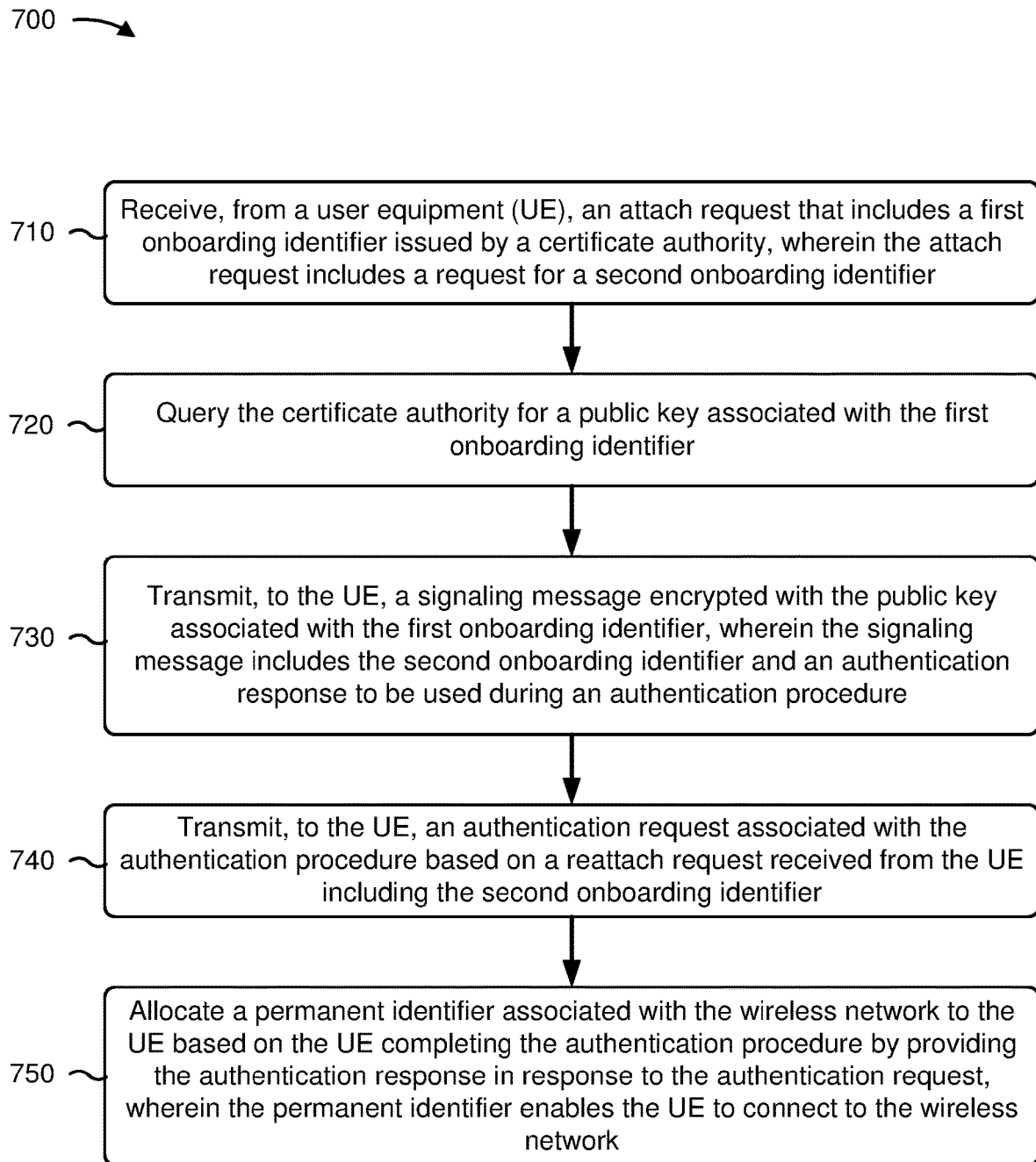

FIG. 7 is a flow chart of an example process 700 for secure onboarding of a device having an embedded universal integrated circuit card without a preloaded provisioning profile. In some implementations, one or more process blocks of FIG. 7 can be performed by an onboarding device (e.g., onboarding device 230, onboarding device 370). In some implementations, one or more process blocks of FIG. 7 can be performed by another device or a group of devices separate from or including the onboarding device, such as a user equipment (e.g., user equipment 205, user equipment 305), a base station (e.g., base station 210, base station 315), a core network element (e.g., MME 215, SGW 220, PGW 225, RSP platform 235, HSS 240, AAA 245, NSSF 325, NEF 330, AUSF 335, UDM 340, PCF 345, AF 350, AMF 355, SMF 360, UPF 365, RSP platform 375, and/or the like), a certificate authority (e.g., certificate authority 250, certificate authority 385), and/or the like.

As shown in FIG. 7, process 700 may include receiving, from a user equipment, an attach request that includes a first onboarding identifier issued by a certificate authority, wherein the attach request includes a request for a second onboarding identifier (block 710). For example, the onboarding device (e.g., using processor 420, memory 430, storage component 440, input component 450, output component 460, communication interface 470, and/or the like) may receive, from a user equipment, an attach request that includes a first onboarding identifier issued by a certificate authority, as described above. In some implementations, the attach request includes a request for a second onboarding identifier.

As further shown in FIG. 7, process 700 may include querying the certificate authority for a public key associated with the first onboarding identifier (block 720). For example, the onboarding device (e.g., using processor 420, memory 430, storage component 440, input component 450, output component 460, communication interface 470, and/or the like) may query the certificate authority for a public key associated with the first onboarding identifier, as described above.

As further shown in FIG. 7, process 700 may include transmitting, to the user equipment, a signaling message encrypted with the public key associated with the first onboarding identifier, wherein the signaling message includes the second onboarding identifier and an authentication response to be used during an authentication procedure (block 730). For example, the onboarding device (e.g., using processor 420, memory 430, storage component 440, input component 450, output component 460, communication interface 470, and/or the like) may transmit, to the user equipment, a signaling message encrypted with the public key associated with the first onboarding identifier, as described above. In some implementations, the signaling message includes the second onboarding identifier and an authentication response to be used during an authentication procedure.

As further shown in FIG. 7, process 700 may include transmitting, to the user equipment, an authentication request associated with the authentication procedure based on a reattach request received from the user equipment including the second onboarding identifier (block 740). For example, the onboarding device (e.g., using processor 420, memory 430, storage component 440, input component 450, output component 460, communication interface 470, and/or the like) may transmit, to the user equipment, an authentication request associated with the authentication procedure based on a reattach request received from the user equipment including the second onboarding identifier, as described above.

As further shown in FIG. 7, process 700 may include allocating a permanent identifier associated with the wireless network to the user equipment based on the user equipment completing the authentication procedure by providing the authentication response in response to the authentication request, wherein the permanent identifier enables the user equipment to connect to the wireless network (block 750). For example, the onboarding device (e.g., using processor 420, memory 430, storage component 440, input component 450, output component 460, communication interface 470, and/or the like) may allocate a permanent identifier associated with the wireless network to the user equipment based on the user equipment completing the authentication procedure by providing the authentication response in response to the authentication request, as described above. In some implementations, the permanent identifier enables the user equipment to connect to the wireless network.

Process 700 can include additional implementations, such as any single implementation or any combination of implementations described below and/or in connection with one or more other processes described elsewhere herein.

In some implementations, the onboarding device may grant the user equipment access to a Remote SIM Provisioning (RSP) platform configured to provide the user equipment with an operational profile containing the permanent identifier for connecting to the wireless network based on the user equipment completing the authentication procedure.

In some implementations, the second onboarding identifier and the permanent identifier are issued by a mobile network operator associated with the wireless network. In some implementations, the request for the second onboarding identifier includes an identifier associated with an operator-reserved Protocol Configuration Options (PCO) container used to convey the signaling message to the user equipment.

In some implementations, the onboarding device may return the second onboarding identifier to a pool of onboarding identifiers used to onboard new devices onto the wireless network based on receiving, from the user equipment, a new attach request that includes the permanent identifier.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a user equipment, a first onboarding identifier from a certificate authority,
        wherein the first onboarding identifier is associated with a private key that is stored on the user equipment;
    transmitting, by the user equipment, an attach request to a device on a wireless network,
        wherein the user equipment has an embedded Universal Integrated Circuit Card (eUICC) that uses the first onboarding identifier to transmit the attach request, and
        wherein the attach request includes a request for a second onboarding identifier;

receiving, by the user equipment, a signaling message that includes the second onboarding identifier from the device on the wireless network,
  wherein the signaling message is encrypted with a public key paired with the private key stored on the user equipment;
decrypting, by the user equipment, the signaling message using the private key stored on the user equipment to obtain the second onboarding identifier;
obtaining, by the user equipment, a permanent identifier from a Remote SIM Provisioning (RSP) platform associated with the wireless network based on the user equipment completing an authentication procedure using the second onboarding identifier; and
connecting, by the user equipment, to the wireless network using the permanent identifier obtained from the RSP platform.

2. The method of claim 1, wherein:
the signaling message further includes an authentication response encrypted with the public key paired with the private key stored on the user equipment, and
the user equipment decrypts the signaling message using the private key to further obtain the authentication response.

3. The method of claim 2, wherein obtaining the permanent identifier comprises:
transmitting, to the device on the wireless network, a reattach request using the second onboarding identifier obtained from the decrypted signaling message;
receiving an authentication request associated with the second onboarding identifier; and
transmitting the authentication response obtained from the decrypted signaling message in response to the authentication request to complete the authentication procedure.

4. The method of claim 1, wherein the permanent identifier is associated with an operational profile that the eUICC uses to connect to the wireless network.

5. The method of claim 4, wherein the user equipment completes the authentication procedure using the second onboarding identifier to obtain access to the RSP platform and to download the operational profile from the RSP platform.

6. The method of claim 1, further comprising:
generating a key pair that includes the private key and the public key;
sending, to the certificate authority, a certificate signing request based on the public key and an International Mobile Equipment Identity (IMEI) that uniquely identifies the user equipment; and
receiving, from the certificate authority, a signed digital certificate that includes the first onboarding identifier based on the certificate signing request.

7. The method of claim 1, wherein the request for the second onboarding identifier includes an identifier associated with an operator-reserved Protocol Configuration Options (PCO) container used to convey the signaling message to the user equipment.

8. The method of claim 1, further comprising:
enabling the permanent identifier for use by the eUICC; and
disabling use of the second onboarding identifier by the eUICC based on enabling the permanent identifier.

9. The method of claim 1, wherein the first onboarding identifier and the private key are stored on the user equipment at a time of manufacture.

10. A user equipment, comprising:
one or more memories; and
one or more processors communicatively coupled to the one or more memories, to:
  transmit an attach request to a device on a wireless network using a first onboarding identifier stored in the one or more memories,
    wherein the first onboarding identifier is associated with a private key stored in the one or more memories, and
    wherein the attach request includes an identifier associated with a signaling message used for onboarding onto the wireless network;
  receive the signaling message from the device on the wireless network,
    wherein the signaling message is encrypted with a public key paired with the private key stored in the one or more memories;
  decrypt the signaling message using the private key stored in the one or more memories to obtain a second onboarding identifier and an authentication response;
  obtain access to a Remote SIM Provisioning (RSP) platform associated with the wireless network based on completing an authentication procedure using the second onboarding identifier and the authentication response obtained from the decrypted signaling message; and
  connect to the wireless network using a permanent identifier contained in an operational profile obtained from the RSP platform.

11. The user equipment of claim 10, wherein the one or more processors, when obtaining the access to the RSP platform, are to:
transmit, to the device on the wireless network, a reattach request using the second onboarding identifier obtained from the decrypted signaling message;
receive an authentication request associated with the second onboarding identifier based on the reattach request; and
transmit the authentication response obtained from the decrypted signaling message in response to the authentication request to complete the authentication procedure.

12. The user equipment of claim 10, wherein the first onboarding identifier is issued by a certificate authority.

13. The user equipment of claim 10, wherein the second onboarding identifier and the permanent identifier are issued by a mobile network operator associated with the wireless network.

14. The user equipment of claim 10, wherein the identifier associated with the signaling message is included in the attach request to register for a container in which the second onboarding identifier and the authentication response are encrypted with the public key paired with the private key stored in the one or more memories.

15. The user equipment of claim 10, wherein the one or more processors are further to:
disable use of the second onboarding identifier based on using the permanent identifier to connect to the wireless network.

16. A method, comprising:
receiving, by a device on a wireless network associated with a mobile network operator, an attach request from a user equipment that includes a first onboarding identifier issued by a certificate authority, wherein the attach request includes a request for a second onboarding identifier;

querying, by the device, the certificate authority for a public key associated with the first onboarding identifier;

transmitting, by the device to the user equipment, a signaling message encrypted with the public key associated with the first onboarding identifier,
wherein the signaling message includes the second onboarding identifier and an authentication response to be used during an authentication procedure;

transmitting, by the device, an authentication request associated with the authentication procedure to the user equipment based on a reattach request received from the user equipment including the second onboarding identifier; and allocating, by the device, a permanent identifier associated with the wireless network to the user equipment based on the user equipment completing the authentication procedure by providing the authentication response in response to the authentication request,
wherein the permanent identifier enables the user equipment to connect to the wireless network.

17. The method of claim 16, further comprising:
granting the user equipment access to a Remote SIM Provisioning (RSP) platform configured to provide the user equipment with an operational profile containing the permanent identifier for connecting to the wireless network based on the user equipment completing the authentication procedure.

18. The method of claim 16, wherein the second onboarding identifier and the permanent identifier are issued by the mobile network operator.

19. The method of claim 16, wherein the request for the second onboarding identifier includes an identifier associated with an operator-reserved Protocol Configuration Options (PCO) container used to convey the signaling message to the user equipment.

20. The method of claim 16, further comprising:
returning the second onboarding identifier to a pool of onboarding identifiers used to onboard new devices onto the wireless network based on receiving, from the user equipment, a new attach request that includes the permanent identifier.

\* \* \* \* \*